US012744567B2

(12) United States Patent
Guetta et al.

(10) Patent No.: US 12,744,567 B2

(45) Date of Patent: Sep. 22, 2026

(54) SPINAL SYMBOL REPETITION FOR MULTIPLE INPUT MULTIPLE OUTPUT SPINAL CODE ENCODING SCHEME

(71) Applicant: QUALCOMM Incorporated, San Diego, CA (US)

(72) Inventors: Matan Guetta, San Diego, CA (US); Peer Berger, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/044,441

(22) Filed: Feb. 3, 2025

(65) Prior Publication Data

US 2026/0230131 A1 Aug. 6, 2026

(51) Int. Cl.

*H04B 7/04* (2017.01)
*H04B 7/0456* (2017.01)
*H04L 1/00* (2006.01)

(52) U.S. Cl.

CPC ........... *H04B 7/0478* (2013.01); *H04B 7/046* (2013.01); *H04L 1/0013* (2013.01)

(58) Field of Classification Search

CPC ...... H04B 7/0478; H04B 7/046; H04L 1/0013
USPC ......................................... 375/262, 267, 299
See application file for complete search history.

(56) References Cited

U.S. PATENT DOCUMENTS

2007/0133691 A1* 6/2007 Kozat ................... H04L 1/0041 375/240.24
2012/0121030 A1* 5/2012 Luo ......................... H04L 1/005 375/261
2012/0213307 A1* 8/2012 Perry ....................... H04B 1/10 375/296
2015/0003557 A1* 1/2015 Perry ........................ H04L 1/08 375/285
2015/0358058 A1* 12/2015 Chai .................... H04B 7/0667 370/329

(Continued)

OTHER PUBLICATIONS

International Search Report and Written Opinion—PCT/US2025/059004—ISA/EPO—Apr. 23, 2026.

(Continued)

*Primary Examiner* — Emmanuel Bayard
(74) *Attorney, Agent, or Firm* — Harrity & Harrity LLP

(57) ABSTRACT

Various aspects generally relate to wireless communications. Some aspects more specifically relate to spinal symbol repetition for a multiple input multiple output (MIMO) spinal code encoding scheme. A transmitting device may obtain a plurality of spinal symbols associated with the MIMO spinal code encoding scheme. In some aspects, the transmitting device may map each spinal symbol of the spinal symbols to one or more transmission vectors of a plurality of transmission vectors of a MIMO transmission matrix. In these aspects, each transmission vector may correspond to a matrix element of the MIMO transmission matrix, and each matrix element may be associated with a single resource element and a single layer. At least one spinal symbol of the plurality of spinal symbols may be mapped to two or more transmission vectors of the MIMO transmission matrix using adjacent spinal symbol repetition or non-adjacent spinal symbol repetition.

30 Claims, 13 Drawing Sheets

(56) References Cited

U.S. PATENT DOCUMENTS

2023/0155728 A1 5/2023 Kutz et al.

OTHER PUBLICATIONS

Wang L., et al., "Research and Implementation of Rateless Spinal Codes Based Massive MIMO System", Wireless Communications and Mobile Computing, vol. 2018, No. 1, Apr. 2, 2018, 9 Pages, XP093381352, Sections 1, 2, 3 and 5, p. 1-p. 9.

* cited by examiner

645

650

Decoding order: $S_1$:[$L_4$,$RE_1$], $S_2$:[$L_3$,$RE_1$], $S_2$:[$L_2$,$RE_1$], $S_3$:[$L_1$,$RE_1$], $S_3$:[$L_4$,$RE_2$], $S_4$:[$L_3$,$RE_2$], $S_5$:[$L_2$,$RE_2$], $S_5$:[$L_1$,$RE_2$], ...

660

Decoding order: $S_1$:[$L_4$,$RE_2$], $S_2$:[$L_3$,$RE_2$], $S_2$:[$L_4$,$RE_1$], $S_3$:[$L_3$,$RE_2$], $S_3$:[$L_4$,$RE_3$], $S_4$:[$L_3$,$RE_1$], $S_5$:[$L_3$,$RE_3$], $S_5$:[$L_1$,$RE_2$], ...

SPINAL SYMBOL REPETITION FOR MULTIPLE INPUT MULTIPLE OUTPUT SPINAL CODE ENCODING SCHEME

FIELD OF THE DISCLOSURE

Aspects of the present disclosure generally relate to wireless communication and specifically relate to techniques, apparatuses, and methods associated with spinal symbol repetition for multiple input multiple output spinal code encoding schemes.

BACKGROUND

Wireless communication systems are widely deployed to provide various services, which may involve carrying or supporting voice, text, other messaging, video, data, and/or other traffic. Typical wireless communication systems may employ multiple-access radio access technologies (RATs) capable of supporting communication among multiple wireless communication devices including user devices or other devices by sharing the available system resources (for example, time domain resources, frequency domain resources, spatial domain resources, and/or device transmit power, among other examples). Such multiple-access RATs are supported by technological advancements that have been adopted in various telecommunication standards, which define common protocols that enable different wireless communication devices to communicate on a local, municipal, national, regional, or global level.

An example telecommunication standard is New Radio (NR). NR, which may also be referred to as 5G, is part of a continuous mobile broadband evolution promulgated by the Third Generation Partnership Project (3GPP). NR (and other RATs beyond NR) may be designed to better support enhanced mobile broadband (eMBB) access, Internet of things (IoT) networks or reduced capability device deployments, and ultra-reliable low latency communication (URLLC) applications. To support these verticals, NR systems may be designed to implement a modularized functional infrastructure, a disaggregated and service-based network architecture, network function virtualization, network slicing, multi-access edge computing, millimeter wave (mmWave) technologies including massive multiple-input multiple-output (MIMO), licensed and unlicensed spectrum access, non-terrestrial network (NTN) deployments, sidelink and other device-to-device direct communication technologies (for example, cellular vehicle-to-everything (CV2X) communication), multiple-subscriber implementations, high-precision positioning, and/or radio frequency (RF) sensing, among other examples. As the demand for connectivity continues to increase, further improvements in NR may be implemented, and other RATs, such as 6G and beyond, may be introduced to enable new applications and facilitate new use cases.

Spinal codes are a class of Euclidean codes, which are typically rateless codes that can handle time-varying channel conditions without requiring explicit bit rate selection. Spinal codes involve transmission at a higher rate than a channel can sustain followed by iterative re-transmission of information bits to lower the effective rate until a decoding success occurs (for example, until the receiver transmits an acknowledgment (ACK) or a negative acknowledgment (NACK)). More specifically, the transmitter may perform the encoding once, and the channel rate may be changed based at least in part on the total quantity of channel uses.

SUMMARY

Some aspects described herein relate to a method for wireless communication by a transmitting device. The method may include obtaining a plurality of spinal symbols associated with a multiple input multiple output (MIMO) spinal code encoding scheme. The method may include mapping each spinal symbol of the plurality of spinal symbols to one or more transmission vectors of a plurality of transmission vectors of a MIMO transmission matrix, where each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and where at least one spinal symbol of the plurality of spinal symbols is mapped to two or more transmission vectors of the plurality of transmission vectors of the MIMO transmission matrix. The method may include transmitting the plurality of spinal symbols in accordance with the MIMO transmission matrix.

Some aspects described herein relate to a transmitting device for wireless communication. The transmitting device may include a processing system that includes one or more processors and one or more memories coupled with the one or more processors. The processing system may be configured to cause the transmitting device to obtain a plurality of spinal symbols associated with a MIMO spinal code encoding scheme. The processing system may be configured to cause the transmitting device to map each spinal symbol of the plurality of spinal symbols to one or more transmission vectors of a plurality of transmission vectors of a MIMO transmission matrix. The processing system may be configured to cause the transmitting device to transmit the plurality of spinal symbols in accordance with the MIMO transmission matrix.

Some aspects described herein relate to a non-transitory computer-readable medium that stores a set of instructions for wireless communication by a transmitting device. The set of instructions, when executed by one or more processors of the transmitting device, may cause the transmitting device to obtain a plurality of spinal symbols associated with a MIMO spinal code encoding scheme. The set of instructions, when executed by one or more processors of the transmitting device, may cause the transmitting device to map each spinal symbol of the plurality of spinal symbols to one or more transmission vectors of a plurality of transmission vectors of a MIMO transmission matrix. The set of instructions, when executed by one or more processors of the transmitting device, may cause the transmitting device to transmit the plurality of spinal symbols in accordance with the MIMO transmission matrix.

Some aspects described herein relate to an apparatus for wireless communication. The apparatus may include means for obtaining a plurality of spinal symbols associated with a MIMO spinal code encoding scheme. The apparatus may include means for mapping each spinal symbol of the plurality of spinal symbols to one or more transmission vectors of a plurality of transmission vectors of a MIMO transmission matrix, where each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and where at least one spinal symbol of the plurality of spinal symbols is mapped to two or more transmission vectors of the plurality of transmission vectors of the MIMO transmission matrix. The apparatus may include means for transmitting the plurality of spinal symbols in accordance with the MIMO transmission matrix.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, this specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
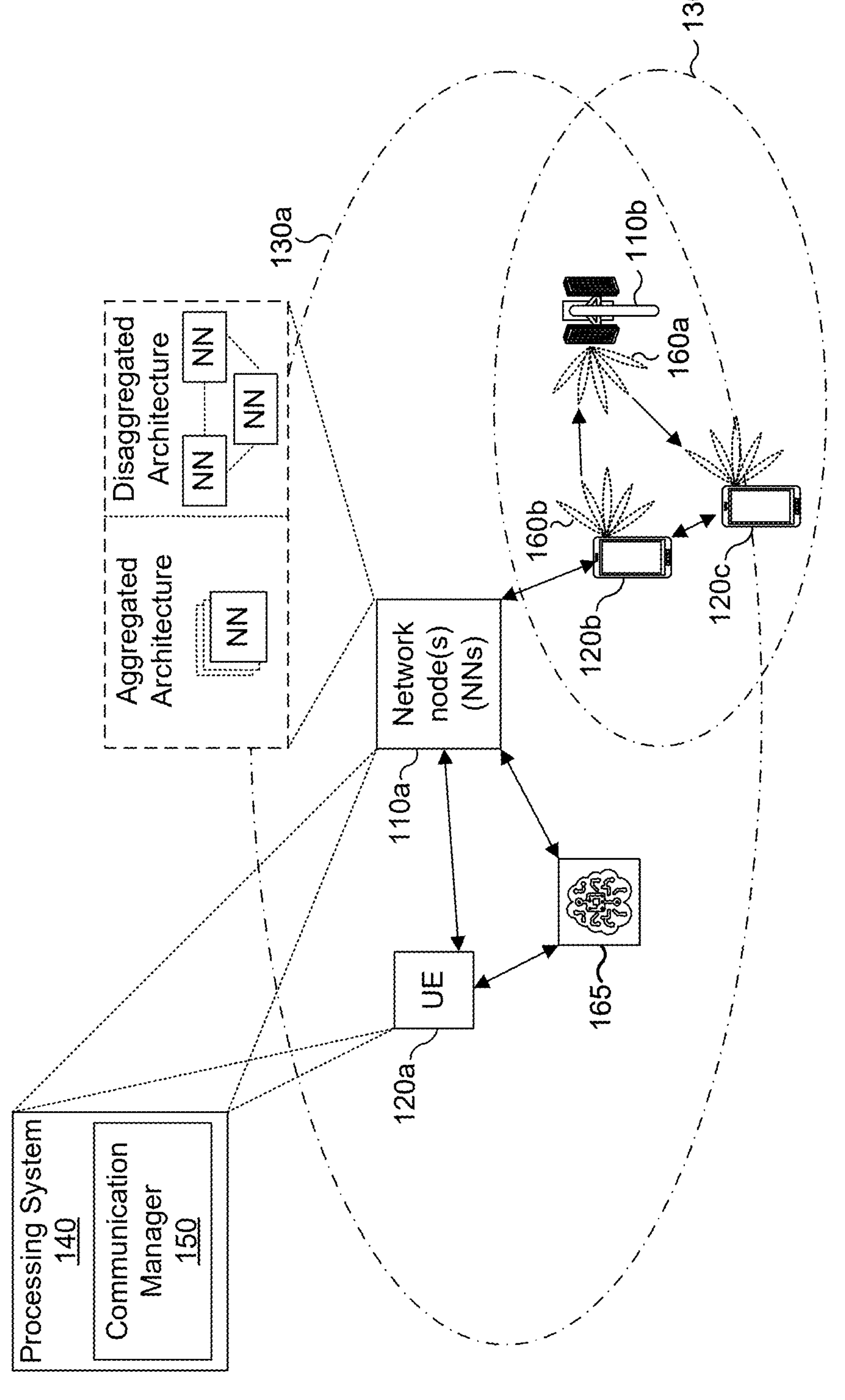
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms. The present disclosure is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Binary coding schemes involve separately encoding and modulating a communication. Various types of binary codes are used in telecommunications. For example, a New Radio (NR) physical downlink shared channel (PDSCH) uses binary low-density parity check (LDPC) code, an NR physical downlink control channel (PDCCH) uses binary polar code, a Long Term Evolution (LTE) PDSCH uses binary turbo code, an LTE PDCCH uses binary convolution code, and so forth. However, binary codes can be less spectrally efficient than non-binary coding schemes, particularly for short block lengths. Non-binary codes, which involve jointly encoding and modulating a communication, offer an attractive tradeoff between performance and complexity.

Spinal codes are a class of Euclidean codes, which are typically rateless codes that can handle time-varying channel conditions without requiring explicit bit rate selection. Spinal codes involve transmission at a higher rate than a channel can sustain followed by iterative re-transmission of information bits to lower the effective rate until a decoding success occurs (for example, until the receiver transmits an acknowledgment (ACK) or a negative acknowledgment (NACK)). More specifically, the transmitter may perform the encoding once and the channel rate may be changed based at least in part on the total quantity of channel uses, where each channel use of the total quantity of channel uses refers to a single instance of transmitting a symbol through a channel. In some examples, a transmission of some or all of the resource elements and layers associated with a multiple input multiple output (MIMO) transmission (described in more detail below) may be performed in a single channel use.

In some examples, wireless communication systems employing spinal codes may be limited to single input single output (SISO)-based communications. This is because current wireless communication standards, such as standards promulgated by the Third Generation Partnership Project (3GPP), may not provide signaling support for other types of spinal-code-based communications, such as MIMO-based transmissions or the like. Moreover, a decoding complexity traditionally associated with certain spinal code encoding schemes may make spinal codes unattractive for wireless communication systems. Accordingly, spinal codes may have limited applicability in current wireless communication systems in which MIMO-based communications are becoming ubiquitous.

Various aspects generally relate to wireless communications. Some aspects more specifically relate to spinal symbol repetition for MIMO spinal code encoding schemes. A transmitting device may obtain a plurality of spinal symbols associated with a MIMO spinal code encoding scheme. For example, the transmitting device may generate one or more spinal codes, as described above, and may encode the one or more spinal codes to obtain a plurality of spinal symbols that can be transmitted over a channel. In some aspects, the transmitting device may map each spinal symbol of the spinal symbols to one or more transmission vectors of a plurality of transmission vectors of a MIMO transmission matrix. In these aspects, each transmission vector may correspond to a matrix element of a plurality of matrix elements of the MIMO transmission matrix, and each matrix element of the plurality of matrix elements may be associated with a single resource element and a single layer of the MIMO spinal code encoding scheme. In some aspects, there is a one-to-one relationship between a transmission vector and a matrix element. In these aspects, for each transmission vector, there may be a corresponding matrix element, and for each matrix element, there may be corresponding transmission vector.

In some aspects, at least one spinal symbol of the plurality of spinal symbols may be mapped to two or more transmission vectors of the MIMO transmission matrix. A spinal symbol that is mapped to two or more matrix elements may be referred to as a repetition symbol. In one example, the MIMO transmission matrix may have four layers and three resource elements. Therefore, the MIMO transmission matrix may have twelve matrix elements corresponding to twelve transmission vectors. In this example, the transmitting device may determine to transmit seven spinal symbols using the twelve transmission vectors. Therefore, the transmitting device may transmit a subset of the spinal symbols multiple times such that two or more transmission vectors transmit the same symbol (for example, resulting in symbol repetition).

In some aspects, the transmitting device may transmit the repetition symbols using adjacent symbol repetition. In these aspects, the repetition symbols are associated with the same resource element and with different layers. For example, a spinal symbol may be transmitted using a first layer and a first resource element of the MIMO spinal code encoding scheme and may be transmitted using a second layer and the first resource element of the MIMO spinal code encoding scheme. In some other aspects, the transmitting device may transmit the repetition symbols using non-adjacent symbol repetition. In these aspects, the repetition symbols are associated with different resource elements. For example, a second spinal symbol may be transmitted twice, once on a first resource element of multiple resource elements and again on a second resource element of the multiple resource elements.

In some aspects, the transmitting device may map the spinal symbols to the transmission vectors in accordance with a MIMO puncturing scheme. A MIMO puncturing scheme may indicate one or more spines of the MIMO spinal code encoding scheme from which spinal symbols are to be transmitted. Additionally or alternatively, the MIMO puncturing scheme may indicate one or more spines of the MIMO spinal code encoding scheme from which spinal symbols are not to be transmitted. In some aspects, the MIMO puncturing scheme may indicate one or more parameters for mapping the plurality of spinal symbols to the plurality of resource elements and the plurality of layers. In one example, the transmitting device, in accordance with the MIMO puncturing scheme, may transmit a first quantity of spinal symbols associated with a first spine of a plurality of spines and may transmit a second quantity of spinal symbols associated with a second spine of the plurality of spines.

Particular aspects of the subject matter described in this disclosure can be implemented to realize one or more of the following potential advantages. In some examples, the described techniques can be used to enable spinal symbols to be mapped to a plurality of transmission vectors using spinal symbol repetition. For example, the described techniques can be used to enable the spinal symbols to be mapped to the plurality of transmission vectors using adjacent symbol repetition or using non-adjacent symbol repetition. In some examples, by enabling the spinal symbols to be mapped to the plurality of transmission vectors using spinal symbol repetition, the described techniques can be used to increase spectral efficiency. In some examples, by enabling the spinal symbols to be mapped to the plurality of transmission vectors using spinal symbol repetition, the described techniques can be used to increase a likelihood of data included in the spinal symbols being properly received by a receiving device. In some examples, by enabling the spinal symbols to be mapped to the plurality of transmission vectors using spinal symbol repetition, the described techniques can be used to reduce coding complexity. For example, the described techniques can be used to reduce computational complexity, energy consumption, and latency at both the encoder (for transmitting the spinal symbols) and at the decoder (for receiving the spinal symbols). In some examples, by enabling the spinal symbols to be mapped to the plurality of transmission vectors using spinal symbol repetition, the described techniques can be used to increase a signal-to-noise ratio (SNR) in the communications between the transmitting device and the receiving device. In some examples, by transmitting the same spinal symbol in multiple transmission vectors (e.g., different transmission vectors of the same MIMO transmission matrix), the described techniques can be used to reduce demodulation and decoding complexity at a receiving device. In some examples, by transmitting the same spinal symbol in the multiple transmission vectors of the MIMO transmission matrix, the described techniques can be used to increase a correlation between the repetition symbols. These example advantages, among others, are described in more detail below.

As described above, wireless communication systems may be deployed to provide various services, which may involve carrying or supporting voice, text, other messaging, video, data, and/or other traffic. Some wireless communications systems may employ multiple-access radio access technologies (RATs). The multiple-access RATs may be capable of supporting communication with multiple wireless communication devices by sharing the available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Multiple-access RATs are supported by technological advancements that have been adopted in various telecommunication standards, which define common protocols that enable wireless communication devices to communicate on a local, municipal, enterprise, national, regional, or global level. For example, 5G New Radio (NR) is part of a continuous mobile broadband evolution promulgated by the Third Generation Partnership Project (3GPP). 5G NR may support enhanced mobile broadband (eMBB) access, Internet of Things (IoT) networks or reduced capability (RedCap) device deployments, ultra-reliable low-latency communication (URLLC) applications, and/or massive machine-type communication (mMTC), among other examples.

To support these and other target verticals, a wireless communication system may be designed to implement a modularized functional infrastructure, a disaggregated and service-based network architecture, network function virtualization, network slicing, multi-access edge computing, millimeter wave (mmWave) technologies including massive multiple-input multiple-output (MIMO), beamforming, IoT device or RedCap device connectivity and management, industrial connectivity, licensed and unlicensed spectrum access, sidelink and other device-to-device direct communication (for example, cellular vehicle-to-everything (CV2X) communication), frequency spectrum expansion, overlapping spectrum use, small cell deployments, non-terrestrial network (NTN) deployments, device aggregation, advanced duplex communication (for example, sub-band full-duplex (SBFD)), multiple-subscriber implementations, high-precision positioning, radio frequency (RF) sensing, network energy savings (NES), low-power signaling and radios, and/or artificial intelligence or machine learning (AI/ML), among other examples.

The foregoing and other technological improvements may support use cases, such as wireless fronthauls, wireless midhauls, wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples.

As the demand for connectivity continues to increase, further improvements in NR may be implemented, and other RATs, such as 6G and beyond, may be introduced to enable new applications and facilitate new use cases. The methods, operations, apparatuses, and techniques described herein may enable one or more of the foregoing technologies or new technologies and/or support one or more of the foregoing use cases or new use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110. For example, in FIG. 1, the wireless communication network 100 includes a network node (NN) 110*a* and a network node 110*b*. The network nodes 110 may support communications with multiple user equipments (UEs) 120. For example, in FIG. 1, the network nodes 110 support communication with a UE 120*a*, a UE 120*b*, and a UE 120*c*. In some examples, a UE 120 may also communicate with other UEs 120 and a network node 110 may communicate with a core network and with other network nodes 110.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency bands or ranges. In some examples, when multiple RATs are deployed in a given geographic area, each RAT in the geographic area may operate on different frequencies to avoid interference with other RATs. Additionally or alternatively, in some examples, the wireless communication network 100 may implement dynamic spectrum sharing (DSS), in which multiple RATs are implemented with dynamic bandwidth allocation (for example, based on user demand) in a single frequency band. In some examples, the wireless communication network 100 may support communication over unlicensed spectrum, where access to an unlicensed channel is subject to a channel access mechanism. For example, in a shared or unlicensed frequency band, a transmitting device may perform a channel access procedure, such as a listen-before-talk (LBT) procedure, to contend against other devices for channel access before transmitting on a shared or unlicensed channel.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHZ), and FR5 (114.25 GHz through 300 GHz). Although a portion of FR1 is greater than 6 GHz, FR1 is often referred to (interchangeably) as a "sub-6 GHZ" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into the mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to mid-band frequencies or to frequencies that are within FR2, FR4, FR4-a or FR4-1, FR5, and/or the EHF band. Higher frequency bands may extend 5G NR operation, 6G operation, and/or other RATs beyond 52.6 GHz.

A network node 110 and/or a UE 120 may include one or more devices, components, or systems that enable communication with other devices, components, or systems of the wireless communication network 100. For example, a UE 120 and a network node 110 may each include one or more chips, system-on-chips (SoCs), chipsets, packages, or devices that individually or collectively constitute or comprise a processing system, such as a processing system 140 of the UE 120 or the network node 110. A processing system (for example, the processing system 140) includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), and/or digital signal processors (DSPs)), processing blocks, application-specific integrated circuits (ASICs), programmable logic devices (PLDs), or other discrete gate or transistor logic or circuitry (any one or more of which may be generally referred to herein individually as a "processor" or collectively as "the processor" or "the processor circuitry"). Such processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set. In some other examples, each of a group of processors may be configurable or configured to perform a same set of functions.

The processing system 140 may include memory circuitry in the form of one or multiple memory devices, memory blocks, memory elements, or other discrete gate or transistor logic or circuitry, each of which may include or implement tangible storage media such as random-access memory (RAM) or read-only memory (ROM), or combinations thereof (any one or more of which may be generally referred to herein individually as a "memory" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code or instructions (such as software) that, when executed by one or more of the processors, may configure one or more of the processors to perform various functions or operations described herein. Additionally or alternatively, in some examples, one or more of the processors may be configured to perform various functions or operations described herein without requiring configuration by software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise.

The processing system 140 may include or be coupled with one or more modems (such as a cellular (for example, a 5G or 6G compliant) modem). In some examples, one or more processors of the processing system 140 include or implement one or more of the modems. The processing system 140 may also include or be coupled with multiple radios (collectively "the radio"), multiple RF chains, or multiple transceivers, each of which may in turn be coupled with one or more of multiple antennas. In some examples, one or more processors of the processing system 140 include or implement one or more of the radios, RF chains, or transceivers. An RF chain may include one or more filters, mixers, oscillators, amplifiers, analog-to-digital converters (ADCs), and/or other devices that convert between an analog signal (such as for transmission or reception via an air interface) and a digital signal (such as for processing by the processing system 140 of the UE 120 or the network node 110).

A network node 110 and a UE 120 may each include one or multiple antennas or antenna arrays. Typical network nodes 110 and UEs 120 may include multiple antennas, which may be organized or structured into one or more antenna panels, one or more antenna groups, one or more sets of antenna elements, or one or more antenna arrays, among other examples. As used herein, the term "antenna" can refer to one or more antennas, one or more antenna panels, one or more antenna groups, one or more sets of antenna elements, or one or more antenna arrays. The term "antenna panel" can refer to a group of antennas (such as antenna elements) arranged in an array or panel, which may facilitate beamforming by manipulating parameters associated with the group of antennas. The term "antenna module" may refer to circuitry including one or more antennas as well as one or more other components (such as filters, amplifiers, or processors) associated with integrating the antenna module into a wireless communication device such as the network node 110 and the UE 120.

A network node 110 may be, may include, or may also be referred to as an NR network node, a 5G network node, a 6G network node, a Node B, a gNB, an access point (AP), a transmission reception point (TRP), a network entity, a network element, a network equipment, and/or another type of device, component, or system included in a radio access network (RAN). In various deployments, a network node 110 may be implemented as a single physical node (for example, a single physical structure) or may be implemented as two or more physical nodes (for example, two or more distinct physical structures). For example, a network node 110 may be a device or system that implements a part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node having an aggregated architecture, meaning that the network node 110 may implement a full radio protocol stack that is physically and logically integrated within a single physical structure in the wireless communication network 100. For example, an aggregated network node 110 may consist of a single standalone base station or a single TRP that operates with a full radio protocol stack to enable or facilitate communication between a UE 120 and a core network of the wireless communication network 100.

Alternatively, and as also shown, a network node 110 may be a disaggregated network node (sometimes referred to as a disaggregated base station), having a disaggregated architecture, meaning that the network node 110 may operate with a radio protocol stack that is physically distributed and/or logically distributed among two or more nodes in the same geographic location or in different geographic locations. An example disaggregated network node architecture is described in more detail below with reference to FIG. 2. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating network functionality into multiple units or modules that can be individually deployed.

The network nodes 110 of the wireless communication network 100 may include one or more central units (CUs), one or more distributed units (DUs), and one or more radio units (RUs). A CU may host one or more higher layers, such as a radio resource control (RRC) layer, a packet data convergence protocol (PDCP) layer, and a service data adaptation protocol (SDAP) layer, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host a lower PHY layer that is configured to perform functions, such as a fast Fourier transform (FFT), an inverse FFT (IFFT), beamforming, and/or physical random access channel (PRACH) extraction and filtering, among other examples. An RU may perform RF processing functions or lower PHY layer functions, such as an FFT, an IFFT, beamforming, or PRACH extraction and filtering, among other examples, in accordance with a functional split, such as a lower layer split (LLS). In such an architecture, each RU can be operated to handle over the air (OTA) communication with one or more UEs 120. In some examples, a single network node 110 may include a combination of one or more CUs, one or more DUs, and/or one or more RUs. In some examples, a CU, a DU, and/or an RU may be implemented as a virtual unit, such as a virtual central unit (VCU), a virtual distributed unit (VDU), or a virtual radio unit (VRU), among other examples, which may be implemented as a virtual network function, such as in a cloud deployment.

Some network nodes 110 (for example, a base station, an RU, or a TRP) may provide communication coverage for a particular geographic area. The term "cell" can refer to a coverage area of a network node 110 or to a network node 110 itself, depending on the context in which the term is used. A network node 110 may support one or more cells (for example, each cell may support communication within an angular (for example, 60 degree) range around the network node). In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with associated service subscriptions. A pico cell may cover a relatively small geographic area and may also allow unrestricted access by UEs 120 with associated service subscriptions. A femto cell may cover a relatively small geographic area (for example, a home) and may allow restricted access by UEs 120 having association with the femto cell (for example, UEs 120 in a closed subscriber group (CSG)). In some examples, a cell may not necessarily be stationary. For example, the geographic area of the cell may move in accordance with the location of an associated mobile network node 110 (for example, a train, a satellite, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. Various different types of network nodes 110 may generally transmit at different power levels, serve different coverage areas (for example, a cell 130*a* and a cell 130*b*), and/or have different impacts on interference in the wireless communication network 100 than other types of network nodes 110.

The UEs 120 may be physically dispersed throughout the coverage area of the wireless communication network 100, and each UE 120 may be stationary or mobile. A UE 120 may be, may include, or may also be referred to as an access terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a netbook, a smartbook, an ultrabook, a medical device, a biometric device, a wearable device (for example, a smart watch, smart clothing, smart glasses, a smart wristband, or smart jewelry), a gaming device, an entertainment device (for example, a music device, a video device, or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

Some UEs 120 may be classified in accordance with different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between that of the UEs 120 of the first category and that of the UEs 120 of the second capability). A UE 120 of the third category may be referred to as a reduced capability UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, or cameras that are associated with a limited bandwidth, power capacity, and/or transmission range, among other examples. RedCap UEs may support healthcare environments, building automation, electrical distribution, process automation, transport and logistics, or smart city deployments, among other examples.

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink and uplink resources may include time domain resources (for example, frames, subframes, slots, and symbols), frequency domain resources (for example, frequency bands, component carriers (CCs), subcarriers, resource blocks, and resource elements), and spatial domain resources (for example, particular transmit directions or beams).

Frequency domain resources may be subdivided into bandwidth parts (BWPs). A BWP may be a block of frequency domain resources (for example, a continuous set of resource blocks (RBs) within a full component carrier bandwidth) that may be configured at a UE-specific level. A UE 120 may be configured with both an uplink BWP and a downlink BWP (which may be the same or different). Each BWP may be associated with its own numerology (indicating a sub-carrier spacing (SCS) and cyclic prefix (CP)). A BWP may be dynamically configured or activated (for example, by a network node 110 transmitting a downlink control information (DCI) configuration to the one or more UEs 120) and/or reconfigured (for example, in real-time or near-real-time) in accordance with changing network conditions in the wireless communication network 100 and/or specific requirements of one or more UEs 120. An active BWP defines the operating bandwidth of the UE 120 within the operating bandwidth of the serving cell. The use of BWPs enables more efficient use of the available frequency domain resources in the wireless communication network 100 because fewer frequency domain resources may be allocated to a BWP for a UE 120 (which may reduce the quantity of frequency domain resources that a UE 120 is required to monitor and reduce UE power consumption by enabling the UE to monitor fewer frequency domain resources), leaving more frequency domain resources to be spread across multiple UEs 120. Thus, BWPs may also assist in the implementation of lower-capability (for example, RedCap) UEs 120 by facilitating the configuration of smaller bandwidths for communication by such UEs 120 and/or by facilitating reduced UE power consumption.

As used herein, a downlink signal may be or include a reference signal, control information, or data. For example, downlink reference signals include a primary synchronization signal (PSS), a secondary SS (SSS), an SS block (SSB) (for example, that includes a PSS, an SSS, and a physical broadcast channel (PBCH)), a demodulation reference signal (DMRS), a phase tracking reference signal (PTRS), a tracking reference signal (TRS), and a channel state information (CSI) reference signal (CSI-RS), among other examples. A downlink signal carrying control information or data may be transmitted via a downlink channel. Downlink channels may include one or more control channels for transmitting control information and one or more data channels for transmitting data. Downlink reference signals may be transmitted in addition to, or multiplexed with, downlink control channel communications and/or downlink data channel communications. A downlink control channel may be specifically used to transmit DCI from a network node 110 to a UE 120. DCI generally contains the information the UE 120 needs to identify RBs in a subsequent subframe and how to decode them, including a modulation and coding scheme (MCS) or redundancy version parameters. Different DCI formats carry different information, such as scheduling information in the form of downlink or uplink grants, slot formal indicators (SFIs), preemption indicators (PIs), transmit power control (TPC) commands, hybrid automatic repeat request (HARQ) information, new data indicators (NDIs), among other examples. A downlink data channel may be used to transmit downlink data (for example, user data associated with a UE 120) from a network node 110 to a UE 120. Downlink control channels may include physical downlink control channels (PDCCHs), and downlink data channels may include physical downlink shared channels (PDSCHs). Control information or data communications may be transmitted on a PDCCH and PDSCH, respectively. For example, a PDCCH can carry DCI, while a PDSCH can carry a MAC control element (MAC-CE), an RRC message, or user data, among other examples. Each PDSCH may carry one or more transport blocks (TBs) of data.

As used herein, an uplink signal may include a reference signal, control information, or data. For example, uplink reference signals include a sounding reference signal (SRS), a PTRS, and a DMRS, among other examples. An uplink signal carrying control information or data may be transmitted via an uplink channel. An uplink channel may include one or more control channels for transmitting control information and one or more data channels for transmitting data. Uplink reference signals may be transmitted in addition to, or multiplexed with, uplink control channel communications and/or uplink data channel communications. An uplink control channel may be specifically used to transmit uplink control information (UCI) from a UE 120 to a network node 110. An uplink data channel may be used to transmit uplink data (for example, user data associated with a UE 120) from a UE 120 to a network node 110. Uplink control channels may include physical uplink control channels (PUCCHs), and uplink data channels may include physical uplink shared channels (PUSCHs). Control information or data communications may be transmitted on a PUCCH and PUSCH, respectively. For example, a PUCCH can carry UCI, while a PUSCH can carry a MAC-CE, an RRC message, or user data, among other examples. UCI can include a scheduling request (SR), HARQ feedback information (for example, a HARQ acknowledgement (ACK) indication or a HARQ negative acknowledgement (NACK) indication), uplink power control information (for example, an uplink TPC parameter), and/or CSI, among other examples. CSI can include a channel quality indicator (CQI) (indicative of downlink channel conditions to facilitate selection of transmission parameters, such as an MCS, by a network node 110), a precoding matrix indicator (PMI), a CSI-RS resource indicator (CRI) (for example, indicative of a beam used to transmit a CSI-RS), an SS/PBCH resource block indicator (SSBRI) (for example, indicative of a beam used to transmit an SSB), a layer indicator (LI), a rank indicator (RI), and/or measurement information (for example, a layer 1 (L1)-reference signal received power (RSRP) parameter, a received signal strength indicator (RSSI) parameter, a reference signal received quality (RSRQ) parameter, among other examples) which can be used for beam management, among other examples. Each PUSCH may carry one or more TBs of data.

The information (for example, data, control information, or reference signal information) transmitted by a network node 110 to a UE 120, or vice versa, may be represented as a sequence of binary bits that are mapped (for example, modulated) to an analog signal waveform (for example, a discrete Fourier transform (DFT)-spread-orthogonal frequency division multiplexing (OFDM) (DFT-s-OFDM) waveform or a CP-OFDM waveform) that is transmitted by the network node 110 or UE 120 over a wireless communication channel. In some examples, the network node 110 or the UE 120 (for example, using the processing system

140) may select an MCS (for example, an order of quadrature amplitude modulation (QAM), such as 64-QAM, 128-QAM, or 256-QAM, among other examples) for a downlink signal or an uplink signal. For example, the network node 110 may select an MCS for a downlink signal in accordance with UCI received from the UE 120. The network node 110 may transmit, to the UE 120, an indication of the selected MCS for the downlink signal, such as via DCI that schedules the downlink signal. As another example, the network node 110 may transmit, and the UE 120 may receive, an indication of an MCS to be applied for the one or more uplink signals, such as via DCI scheduling transmission of the one or more uplink signals.

The network node 110 or the UE 120 (such as by using the processing system 140 and/or one or more coupled modems) may perform signal processing on the information (such as filtering, amplification, modulation, digital-to-analog conversion, an IFFT operation, multiplexing, interleaving, mapping, and/or encoding, among other examples) to generate a processed signal in accordance with the selected MCS. In some examples, the network node 110 or the UE 120 (for example, using the processing system 140 and/or one or more coupled encoders or modems) may perform a channel coding operation or a forward error correction (FEC) operation to control errors in transmitted information. For example, the network node 110 or the UE 120 may perform an encoding operation to generate encoded information (such as by selectively introducing redundancy into the information, typically using an error correction code (ECC), such as a polar code or a low-density parity-check (LDPC) code). The network node 110 or the UE 120 (for example, using the processing system 140 and/or one or more modems) may further perform spatial processing (for example, precoding) on the encoded information to generate one or more processed or precoded signals for downlink or uplink transmission, respectively. In some examples, the network node 110 or the UE 120 may perform codebook-based precoding or non-codebook-based precoding. Codebook-based precoding may involve selecting a precoder (for example, a precoding matrix) using a codebook. For example, the network node 110 may provide precoding information indicating which precoder, defined by the codebook, is to be used by the UE 120. Non-codebook-based precoding may involve selecting or deriving a precoder based on, or otherwise associated with, one or more downlink or uplink signal measurements. The network node 110 or the UE 120 may transmit the processed downlink or uplink signals, respectively, via one or more antennas.

The network node 110 or the UE 120 may receive uplink signals or downlink signals, respectively, via one or more antennas. The network node 110 or the UE 120 (for example, using the processing system 140 and/or one or more coupled modems) may perform signal processing (for example, in accordance with the MCS) on the received uplink or downlink signals, respectively (such as filtering, amplification, demodulation, analog-to-digital conversion, an FFT operation, demultiplexing, deinterleaving, de-mapping, equalization, interference cancellation, and/or decoding, among other examples), to map the received signal(s) to a sequence of binary bits (for example, received information) that estimates the information transmitted by the network node 110 or the UE 120 via the downlink or uplink signals. The network node 110 or the UE 120 (for example, using processing system 140 and/or a coupled decoder or one or more modems) may decode the received information (such as by using an ECC, a decoding operation, and/or an FEC operation) to detect errors and/or correct bit errors in the received information to generate decoded information. The decoded information may estimate the information transmitted via the downlink or uplink signals.

In some examples, a UE 120 and a network node 110 may perform MIMO communication. "MIMO" generally refers to transmitting or receiving multiple signals (such as multiple layers or multiple data streams) simultaneously over the same time and frequency resources. MIMO techniques generally exploit multipath propagation. A network node 110 and/or UE 120 may communicate using massive MIMO, multi-user MIMO, or single-user MIMO, which may involve rapid switching between beams or cells. For example, the amplitudes and/or phases of signals transmitted via antenna elements and/or sub-elements may be modulated and shifted relative to each other (such as by manipulating a phase shift, a phase offset, and/or an amplitude) to generate one or more beams, which is referred to as beamforming. For example, the network node **110*b* may generate one or more beams 160*a*, and the UE 120*b* may generate one or more beams 160*b***. The term "beam" may refer to a directional transmission of a wireless signal toward a receiving device or otherwise in a desired direction, a directional reception of a wireless signal from a transmitting device or otherwise in a desired direction, a direction associated with a directional transmission or directional reception, a set of directional resources associated with a signal transmission or signal reception (for example, an angle of arrival, a horizontal direction, and/or a vertical direction), a set of parameters that indicate one or more aspects of a directional signal, a direction associated with the signal, and/or a set of directional resources associated with the signal, among other examples.

MIMO may be implemented using various spatial processing or spatial multiplexing operations. In some examples, MIMO may include a massive MIMO technique which may be associated with an increased (for example, "massive") quantity of antennas at the network node 110 and/or at the UE 120, such as in a network implementing mmWave technology. Massive MIMO may improve communication reliability by enabling a network node 110 and/or a UE 120 to communicate the same data across different propagation (or spatial) paths. In some examples, MIMO may support simultaneous transmission to multiple receivers, referred to as multi-user MIMO (MU-MIMO). Some RATs may employ MIMO techniques, such as multi-TRP (mTRP) operation (including redundant transmission or reception on multiple TRPs), reciprocity in the time domain or the frequency domain, single-frequency-network (SFN) transmission, or non-coherent joint transmission (NC-JT).

To support MIMO techniques, the network node 110 and the UE 120 may perform one or more beam management operations, such as an initial beam acquisition operation, one or more beam refinement operations, and/or a beam recovery operation. For example, an initial beam acquisition operation may involve the network node 110 transmitting signals (for example, SSBs, CSI-RSs, or other signals) via respective beams (for example, of the beams **160*a* of the network node 110) and the UE 120 receiving and measuring the signal(s) via respective beams of multiple beams (for example, from the beams 160*b* of the UE 120) to identify a best beam (or beam pair) for communication between the UE 120 and the network node 110. For example, the UE 120 may transmit an indication (for example, in a message associated with a random access channel (RACH) operation) of a (best) identified beam of the network node 110 (for example, by indicating an SSBRI or other identifier associated with the beam). A beam refinement operation may involve a first device (for example, the UE 120 or the network node 110) transmitting signal(s) via a subset of beams (for example, identified based on, or otherwise associated with, measurements reported as part of one or more other beam management operations). A second device (for example, the network node 110 or the UE 120) may receive the signal(s) via a single beam (for example, to identify the best beam for communication from the subset of beams). The beam(s) may be identified via one or more spatial parameters, such as a transmission configuration indicator (TCI) state and/or a quasi co-location (QCL) parameter, among other examples. The network node 110 and the UE 120** may increase reliability and/or achieve efficiencies in throughput, signal strength, and/or other signal properties for massive MIMO operations by performing the beam management operations.

Some aspects and techniques as described herein may be implemented, at least in part, using an artificial intelligence (AI) program (for example, referred to herein as an "AI/ML model"), such as a program that includes a machine learning (ML) model and/or an artificial neural network (ANN) model. The AI/ML model may be deployed at one or more devices 165 (for example, one or more network nodes 110, one or more UEs 120, and/or one or more servers, and/or one or more components of a cloud computing network, among other examples). For example, in an deployment where AI/ML functionality is performed independently at a device 165, sometimes referred to as "overlay AI/ML", the AI/ML model (or an instance or portion of the AI/ML model) may be deployed at a UE 120 (for example, at the processing system 140), a network node 110 (for example, at the processing system 140), one or more servers, and/or one or more components of a cloud computing network, among other examples. Additionally or alternatively, in a deployment where AI/ML functionality is coordinated between different devices 165, sometimes referred to as "coordinated AI/ML", or performed at all device and network layers, sometimes referred to as "native AI/ML", the AI/ML model (or an instance of the AI/ML model) may be deployed at multiple devices 165 (for example, a first portion of the AI/ML model may be deployed at a UE 120 and a second portion of the AI/ML model may be deployed at a network node 110). In other examples of coordinated AI/ML and/or native AI/ML, a first AI/ML model may be deployed at a UE 120 and a second AI/ML model may be deployed at a network node 110. The AI/ML model(s) may be configured to enhance various aspects of the wireless communication network 100 (for example, to increase privacy, reliability, and/or efficient use of network bandwidth, and/or to reduce latency, among other examples). For example, the AI/ML model(s) may be trained to identify patterns or relationships in data corresponding to the wireless communication network 100, a device, and/or an air interface, among other examples. The AI/ML model(s) may support operational decisions relating to one or more aspects associated with wireless communications devices, networks, or services.

Accordingly, in some examples, the AI/ML model(s) may enable AI-as-a-Service (for example, an end-to-end AI/ML service via a user plane) for use cases such as a self-organizing network (SON), minimization of drive test (MDT), quality of experience (QoE), positioning, sensing, predictive mobility, and/or traffic prediction, among other examples. In some examples, AI-as-a-Service use cases may include measurement collection reporting by a UE 120, device selection criteria (for example, in accordance with a geographical area where measurements are to be collected and/or UE capabilities to be used to collected measurements), and/or reporting configurations (for example, reporting parameters such as location, time, and/or sensor information, among other examples). Additionally or alternatively, the AI/ML model(s) may enable AI/ML procedures (for example, RAN-triggered service establishment, configuration, inferencing using UE-side and/or network-side models, performance monitoring and/or management, and/or capability signaling, among other examples). Additionally or alternatively, the AI/ML model(s) may enable RAN-based AI/ML services via one or more application program interfaces (APIs) and/or management interfaces for use cases such as beam management, radio resource monitoring (RRM) relaxation, mobility prediction, load prediction, network energy savings, and/or coverage and capacity improvements, among other examples.

In some aspects, the UE 120 or the network node 110 may include a communication manager 150. As described in more detail elsewhere herein, the communication manager 150 may obtain a plurality of spinal symbols associated with a MIMO spinal code encoding scheme; map each spinal symbol of the plurality of spinal symbols to one or more transmission vectors of a plurality of transmission vectors of a MIMO transmission matrix, wherein each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and wherein at least one spinal symbol of the plurality of spinal symbols is mapped to two or more transmission vectors of the plurality of transmission vectors of the MIMO transmission matrix; and transmit the plurality of spinal symbols in accordance with the MIMO transmission matrix. Additionally or alternatively, the communication manager 150 may perform one or more other operations described herein.

Figure 2:
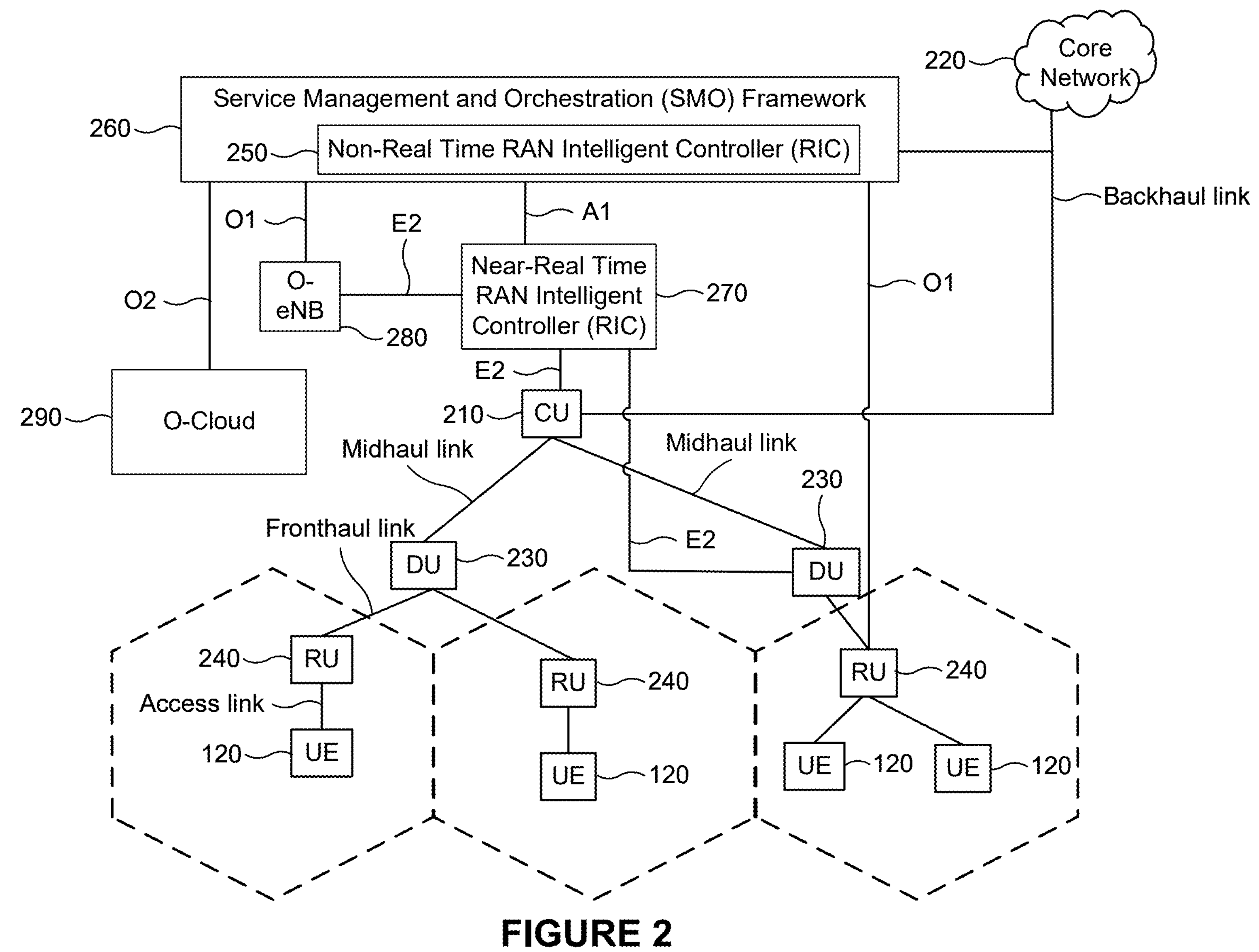
FIG. 2 is a diagram illustrating an example disaggregated network node architecture in accordance with the present disclosure.

FIG. 2 is a diagram illustrating an example disaggregated network node architecture 200 in accordance with the present disclosure. One or more components of the example disaggregated network node architecture 200 may be, may include, or May be included in one or more network nodes (such one or more network nodes 110). The disaggregated network node architecture 200 may include a CU 210 that can communicate directly with a core network 220 via a backhaul link, or that can communicate indirectly with the core network 220 via one or more disaggregated control units, such as a non-real-time (Non-RT) RAN intelligent controller (RIC) 250 associated with a Service Management and Orchestration (SMO) Framework 260 and/or a near-real-time (Near-RT) RIC 270 (for example, via an E2 link). The CU 210 may communicate with one or more DUs 230 via respective midhaul links, such as via F1 interfaces. Each of the DUs 230 may communicate with one or more RUs 240 via respective fronthaul links. Each of the RUs 240 may communicate with one or more UEs 120 via respective RF access links. In some deployments, a UE 120 may be simultaneously served by multiple RUs 240.

Each of the components of the disaggregated network node architecture 200, including the CUs 210, the DUs 230, the RUs 240, the Near-RT RICs 270, the Non-RT RICs 250, and the SMO Framework 260, may include one or more interfaces or may be coupled with one or more interfaces for receiving or transmitting signals, such as data or information, via a wired or wireless transmission medium.

In some aspects, the CU 210 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 210 may be deployed to communicate with one or more DUs 230, as necessary, for network control and signaling. Each DU 230 may correspond to a logical unit that includes one or more base station functions to control the operation of one or more RUs 240. For example, a DU 230 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 230, or for communicating signals with the control functions hosted by the CU 210. Each RU 240 may implement lower layer functionality. In some aspects, real-time and non-real-time aspects of control and user plane communication with the RU(s) 240 may be controlled by the corresponding DU 230.

The SMO Framework 260 may support RAN deployment and provisioning of non-virtualized and virtualized network elements. For non-virtualized network elements, the SMO Framework 260 may support the deployment of dedicated physical resources for RAN coverage requirements, which may be managed via an operations and maintenance interface, such as an O1 interface. For virtualized network elements, the SMO Framework 260 may interact with a cloud computing platform (such as an open cloud (O-Cloud) platform 290) to perform network element life cycle management (such as to instantiate virtualized network elements) via a cloud computing platform interface, such as an O2 interface. A virtualized network element may include, but is not limited to, a CU 210, a DU 230, an RU 240, a non-RT RIC 250, and/or a Near-RT RIC 270. In some aspects, the SMO Framework 260 may communicate with a hardware aspect of a 4G RAN, a 5G NR RAN, and/or a 6G RAN, such as an open eNB (O-eNB) 280, via an O1 interface. Additionally or alternatively, the SMO Framework 260 may communicate directly with each of one or more RUs 240 via a respective O1 interface. In some deployments, this configuration can enable each DU 230 and the CU 210 to be implemented in a cloud-based RAN architecture, such as a vRAN architecture.

The Non-RT RIC 250 may include or may implement a logical function that enables non-real-time control and optimization of RAN elements and resources, AI/ML workflows including model training and updates, and/or policy-based guidance of applications and/or features in the Near-RT RIC 270. The Non-RT RIC 250 may be coupled to or may communicate with (such as via an A1 interface) the Near-RT RIC 270. The Near-RT RIC 270 may include or may implement a logical function that enables near-real-time control and optimization of RAN elements and resources via data collection and actions via an interface (such as via an E2 interface) connecting one or more CUs 210, one or more DUs 230, and/or an O-eNB 280 with the Near-RT RIC 270.

In some aspects, to generate AI/ML models to be deployed in the Near-RT RIC 270, the Non-RT RIC 250 may receive parameters or external enrichment information from external servers. Such information may be utilized by the Near-RT RIC 270 and may be received at the SMO Framework 260 or the Non-RT RIC 250 from non-network data sources or from network functions. In some examples, the Non-RT RIC 250 or the Near-RT RIC 270 may tune RAN behavior or performance. For example, the Non-RT RIC 250 may monitor long-term trends and patterns for performance and may employ AI/ML models to perform corrective actions via the SMO Framework 260 (such as reconfiguration via an O1 interface) or via creation of RAN management policies (such as A1 interface policies).

The network node 110, the UE 120, the processing system 140 of the network node 110 or the UE 120, the CU 210, the DU 230, the RU 240, or any other component(s) of FIG. 1 and/or FIG. 2 may implement one or more techniques or perform one or more operations associated with spinal symbol repetition for MIMO spinal code encoding schemes, as described in more detail elsewhere herein. For example, the processing system 140 of the network node 110, the processing system 140 of the UE 120, the CU 210, the DU 230, or the RU 240 may perform or direct operations of, for example, process 700 of FIG. 7 or other processes as described herein (alone or in conjunction with one or more other processors). Memory of the network node 110 may store data and program code (or instructions) for the network node 110, the CU 210, the DU 230, or the RU 240. In some examples, the memory of the network node 110 may store data relating to a UE 120, such as RRC state information or a UE context. Memory of a UE 120 may store data and program code (or instructions) for the UE 120, such as context information. In some examples, the memory of the UE 120 or the memory of the network node 110 may include a non-transitory computer-readable medium storing a set of instructions for wireless communication. For example, the set of instructions, when executed by one or more processors (for example, of the processing system 140) of the network node 110, the UE 120, the CU 210, the DU 230, or the RU 240, may cause the one or more processors to perform process 700 of FIG. 7 or other processes as described herein. In some examples, executing instructions may include running the instructions, converting the instructions, compiling the instructions, and/or interpreting the instructions, among other examples.

In some aspects, the UE 120 or the network node 110 includes means for obtaining a plurality of spinal symbols associated with a MIMO spinal code encoding scheme; means for mapping each spinal symbol of the plurality of spinal symbols to one or more transmission vectors of a plurality of transmission vectors of a MIMO transmission matrix, wherein each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and wherein at least one spinal symbol of the plurality of spinal symbols is mapped to two or more transmission vectors of the plurality of transmission vectors of the MIMO transmission matrix; and/or means for transmitting the plurality of spinal symbols in accordance with the MIMO transmission matrix. In some aspects, the means for the UE 120 or the network node 110 to perform operations described herein may include, for example, one or more of communication manager 150, processing system 140, a radio, one or more RF chains, one or more transceivers, one or more antennas, one or more modems, a reception component, and/or a transmission component, among other examples.

Figure 3:
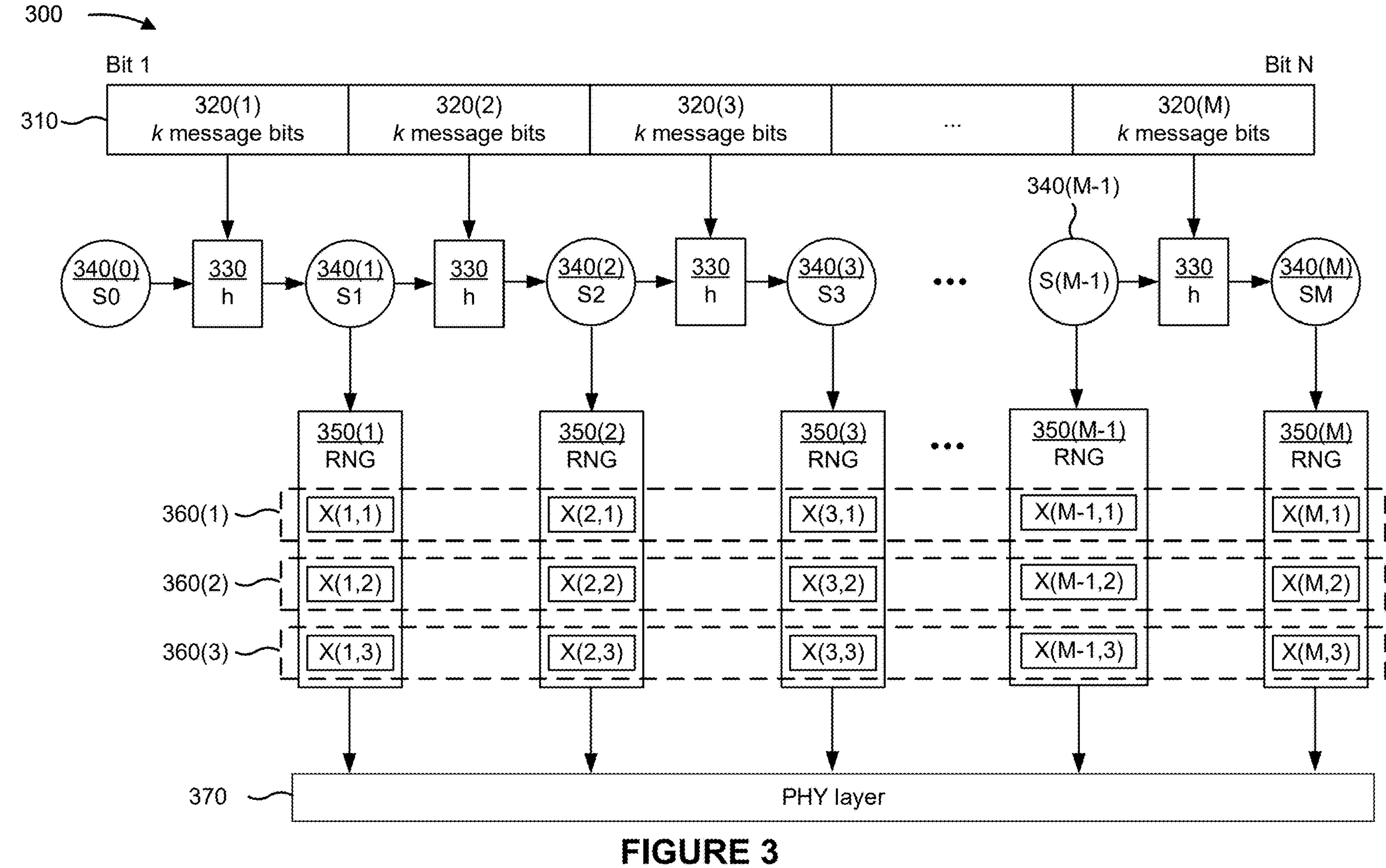
FIG. 3 is a diagram illustrating an example associated with encoding of spinal codes in accordance with the present disclosure.

FIG. 3 is a diagram illustrating an example 300 associated with encoding of spinal codes in accordance with the present disclosure. Other transmission schemes may involve different encoding of spinal codes.

As shown, a transmitting device may break up an input message 310 into blocks (or groups, chunks, or the like) of message bits 320(1)-320(M). The message may have a total of N bits, and each of the blocks of message bits 320(1)-320(M) may have a total of k bits. Thus, the total quantity of the blocks of message bits 320(1)-320(M) may be N/k (for example, M=N/k). The transmitting device may sequentially apply, to the blocks of message bits 320(1)-320(M), a hash function 330 ("h"). The hash function 330 may be designed such that a difference between two input messages in at least one bit results in a different coded sequence after the at least one bit, which may provide resilience to noise and bit errors.

The hash function 330 may also operate on v-bit states 340(0)-340(M−1), where v may be any suitable number (for example, 32). Thus, the hash function 330 may take two inputs: the blocks of message bits 320(1)-320(M) and the v-bit states 340(0)-340(M−1). The hash function 330 may output the v-bit states 340(1)-340(M) based at least in part on the blocks of message bits 320(1)-320(M) and the v-bit states 340(0)-340(M−1). In some examples, $h:\{0,1\}^v \times \{0,1\}^k \rightarrow \{0,1\}^v$. In some examples, $s_i = h(s_{i-1}, \overline{m}_i)$, where $s_i$ is an $i^{th}$ v-bit state 340(*i*) and mi is an $i^{th}$ block of message bits 320(*i*).

For example, initially, the hash function 330 may take, as input, the block of message bits 320(1) and the v-bit state 340(0). The hash function 330 and the v-bit state 340(0) may be known to the transmitting device and the receiving device. In some examples, the v-bit state 340(0) may be zero. The hash function 330 may output the v-bit state 340(1), take, as input, the block of message bits 320(2) and the v-bit state 340(1), and output the v-bit state 340(2). This process may continue until the hash function 330 outputs the v-bit state 340(M). In this manner, the transmitting device may generate a "spine" of v bit states 340(1)-340(M) by sequentially hashing together the blocks of message bits 320(1)-320(M) from the input message 310 without adding redundancy bits.

The hash function 330 may provide the v-bit states 340(1)-340(M) as input (for example, seeds) to random number generators (RNGs) 350(1)-350(M). In some examples, the RNGs 350(1)-350(M) may be known to the transmitting device and the receiving device. The RNGs 350(1)-350(M) may generate sequences of random c-bit binary numbers: $RNG:\{0,1\}^v \times \mathbb{N} \rightarrow \{0,1\}^c$. Thus, the transmitting device may randomly map the blocks of message bits 320(1)-320(M) to respective c-bit binary numbers. In some examples, a c-bit binary number may be a binary word that includes c bits. In some examples, the c-bit binary numbers may map to output IQ constellation symbols. For example, the transmitting device may use a mapping function to randomly select the output IQ constellation symbols. In this manner, the transmitting device may produce a sequence of coded bits and symbol for transmission. In some examples, the total quantity of the blocks of message bits 320(1)-320(M) may be equal to the total quantity of transmitted symbols.

In some examples, each of the RNGs 350(1)-350(M) may generate multiple sequences of random c-bit binary numbers. For example, in a first pass 360(1), the RNGs 350(1)-350(M) may generate first sequences of random c-bit binary numbers. The transmitting device may, using the mapping function, convert the random c-bit binary numbers into first output IQ constellation symbols. The transmitting device may transmit, at a PHY layer 370, one or more samples corresponding to the first output IQ constellation symbols, and if the receiving device responds with a NACK, then the RNGs 350(1)-350(M) may, in a second pass 360(2), generate second sequences of random c-bit binary numbers. A sample may occupy a time window (for example, a slot) during which a transmitted signal has a given amplitude and/or phase corresponding to a given symbol (for example, a sample may encode a symbol). The transmitting device may, using the mapping function, convert the second sequences of random c-bit binary numbers into second output IQ constellation symbols. The transmitting device may transmit, at the PHY layer 370, one or more samples corresponding to the second output IQ constellation symbols, and if the receiving device responds with a NACK, then the RNGs 350(1)-350(M) may, in a third pass 360(3), generate third sequences of random c-bit binary numbers. The transmitting device may, using the mapping function, convert the third sequences of random c-bit binary numbers into third output IQ constellation symbols. The transmitting device may transmit, at the PHY layer 370, one or more samples corresponding to the third output IQ constellation symbols. This process may continue until the transmitting device receives an ACK from the receiving device or a timeout occurs. As used in FIG. 3, the notation "X(Y,Z)" refers to a $Z^{th}$ pass performed by a $Y^{th}$ RNG. In some examples, the transmitting device may transmit one symbol per v-bit state per pass; thus, if the receiving device takes l passes to decode the input message 310, then the effective rate is $$\frac{k}{l}$$

bits per channel use, where k is the maximum rate.

The receiving device (for example, decoder) may sequentially process the received samples until the input message 310 is successfully decoded or a timeout occurs. If the timeout occurs, then the transmitting device may proceed to a subsequent input message. This may be more readily understood with reference to FIG. 4.

Figure 4:
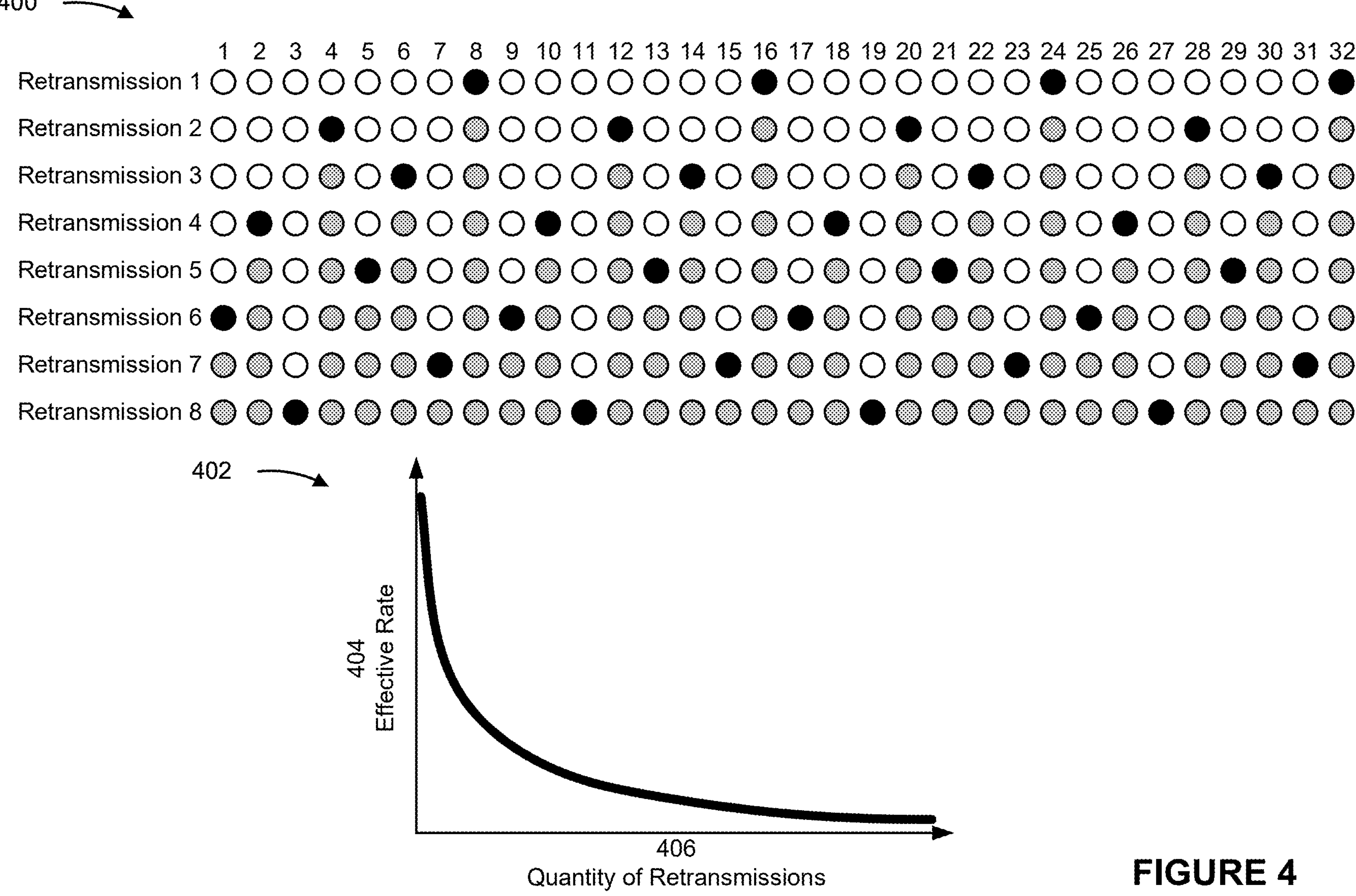
FIG. 4 is a diagram illustrating an example associated with a puncturing scheme for spinal codes in accordance with the present disclosure.

FIG. 4 is a diagram illustrating an example 400 associated with a puncturing scheme for spinal codes in accordance with the present disclosure.

In the example 400, a transmitting device may transmit spinal symbols to a receiving device using a quantity of retransmissions (sometimes referred to as a quantity of subpasses), indexed in FIG. 4 as retransmission 1 through retransmission 8 (but which may include more or fewer retransmissions in other examples). In each retransmission, the transmitting device transmits symbols for spine values marked by black circles, while grey circles indicate symbols that have already been transmitted (for example, in a previous retransmission). In such examples, choosing a quantity of transmitted symbols per retransmission may dictate a rate granularity for the spinal code.

More particularly, in an example in which 256 message bits are to be transmitted (for example, N=256), with each block of message bits (corresponding to each circle in FIG. 4) including eight bits (for example, k=8), the spinal code may be associated with 32 spines (for example, quantity of spines=N/k=32, as described above in connection with FIG. 3). In such an example, a quantity (for example, less than all) of the spinal codes may be transmitted in each retransmission. More particularly, in the first retransmission, the spinal symbols associated with spines indexed 8, 16, 24, and 32 may be transmitted, shown using black circles in connection with the row corresponding to retransmission 1. In the second retransmission, the spinal symbols associated with spines indexed 4, 12, 20, and 28 may be transmitted, shown using black circles in connection with the row corresponding to retransmission 2. Moreover, because the spinal symbols associated with spines indexed 8, 16, 24, and 32 may have previously been transmitted at this point in time (for example, in retransmission 1), those spinal symbols are shown using grey circles in retransmission 2. The transmitting device may continue to transmit spinal symbols in this manner until the message is successfully decoded by the receiving device or until all spinal symbols have been transmitted (for example, as shown in connection with retransmission 8).

Once the message is successfully decoded, the receiving device may transmit an acknowledgement message to the transmitting device, and the transmitting device may forgo transmitting any remaining retransmissions. In that regard, in some examples the spinal code may be considered "rateless," because a coding rate of the spinal code may not be set and/or may vary based on channel conditions, among other examples. For example, as shown in the plot 402, which includes an effective coding rate axis 404 and a quantity of retransmissions axis 406, an effective coding rate may decrease as a quantity of retransmissions used to transmit a message increases. For example, returning to the example described above, the spinal code may start a rate of 8 bits per channel use and may decrease in a manner consistent with the plot 402 as more retransmissions are used, with the total quantity of transmitted symbols per retransmission (for example, four in the above-described example 400) dictating the effective rate granularity. In some examples, using a spinal code as a rateless code may enable use of the spinal code even in the absence of utilizing CSI-RSs or similar mechanisms for determining optimal transmission schemes (for example, optimal MCSs, among other examples). In some other examples, a spinal code may be associated with a fixed rate (for example, the rate of the spinal code may be determined and/or fixed when encoding data), in a similar manner to LDPC codes and/or polar codes, among other examples. For example, a spinal code encoder may limit a quantity of spinal symbols generated and/or a transmitting device may transmit a fixed quantity of spinal symbols in a channel, thereby setting a fixed rate for the spinal code. Additionally or alternatively, spinal codes may be used in a similar manner as LDPC codes and/or polar codes, however, an MCS may be used to generate an equivalent puncturing scheme for the spinal code, among other examples.

In some examples, using spinal codes in MIMO-based wireless communication systems may reduce losses and thus reduce communication errors, resulting in more efficient communications. For example, in a 2×2 MIMO scheme using random precoding (for example, a MIMO scheme using two transmit antennas mapped to two layers and two receive antennas mapped to the two layers), polar codes and/or LDPC (for example, using a bit-interleaved coded modulation (BICM) scheme) codes may result in an approximate 5 decibel (dB) gap from a Shannon limit (a theoretical maximum rate at which information can be transmitted over a communication channel with a given bandwidth and noise level, while still being able to recover the original information with negligible errors), which may include approximately 1.5 dB of shaping loss and approximately 1 dB of coding loss, as well as additional small losses such as demodulator losses, alphabet losses, and/or log-likelihood ratio (LLR) calculation losses, among other examples. In such an example, a potential gain of approximately 3.5 dB may be achieved using a better coded modulation scheme (for example, by using spinal codes rather than LDPC and/or polar codes). Similarly, for other MIMO scenarios the gain may be more significant. For example, for a 4×4 MIMO scenario using random precoding (for example, a MIMO scheme using four transmit antennas mapped to four layers and four receive antennas mapped to the four layers), a potential gain of approximately 4.5 dB may be achieved using a better coded modulation scheme (for example, by using spinal codes rather than LDPC and/or polar codes). In this regard, the potential gain (for example, the reduced gap from a Shannon limit) may increase with an increase in a quantity of layers.

Figure 5A:
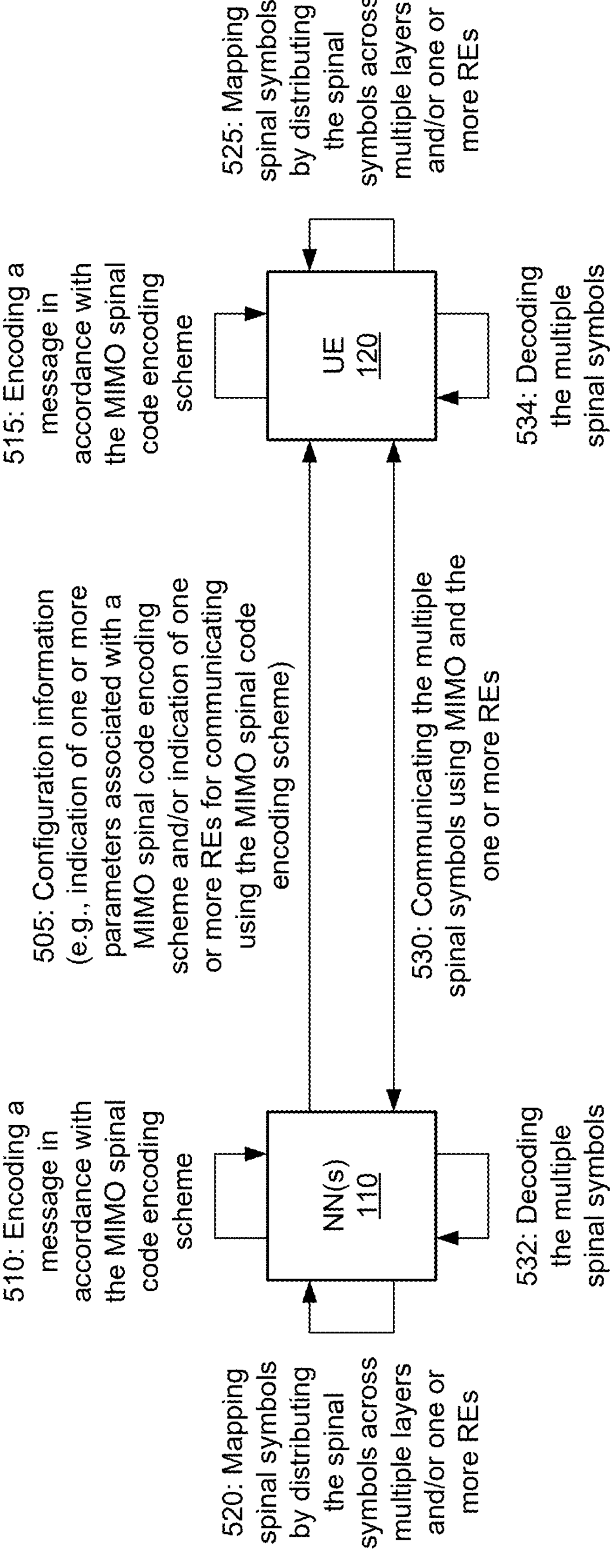
FIGS. 5A-5B are diagrams of examples associated with spinal coding schemes for MIMO wireless communications in accordance with the present disclosure.
Figure 5B:
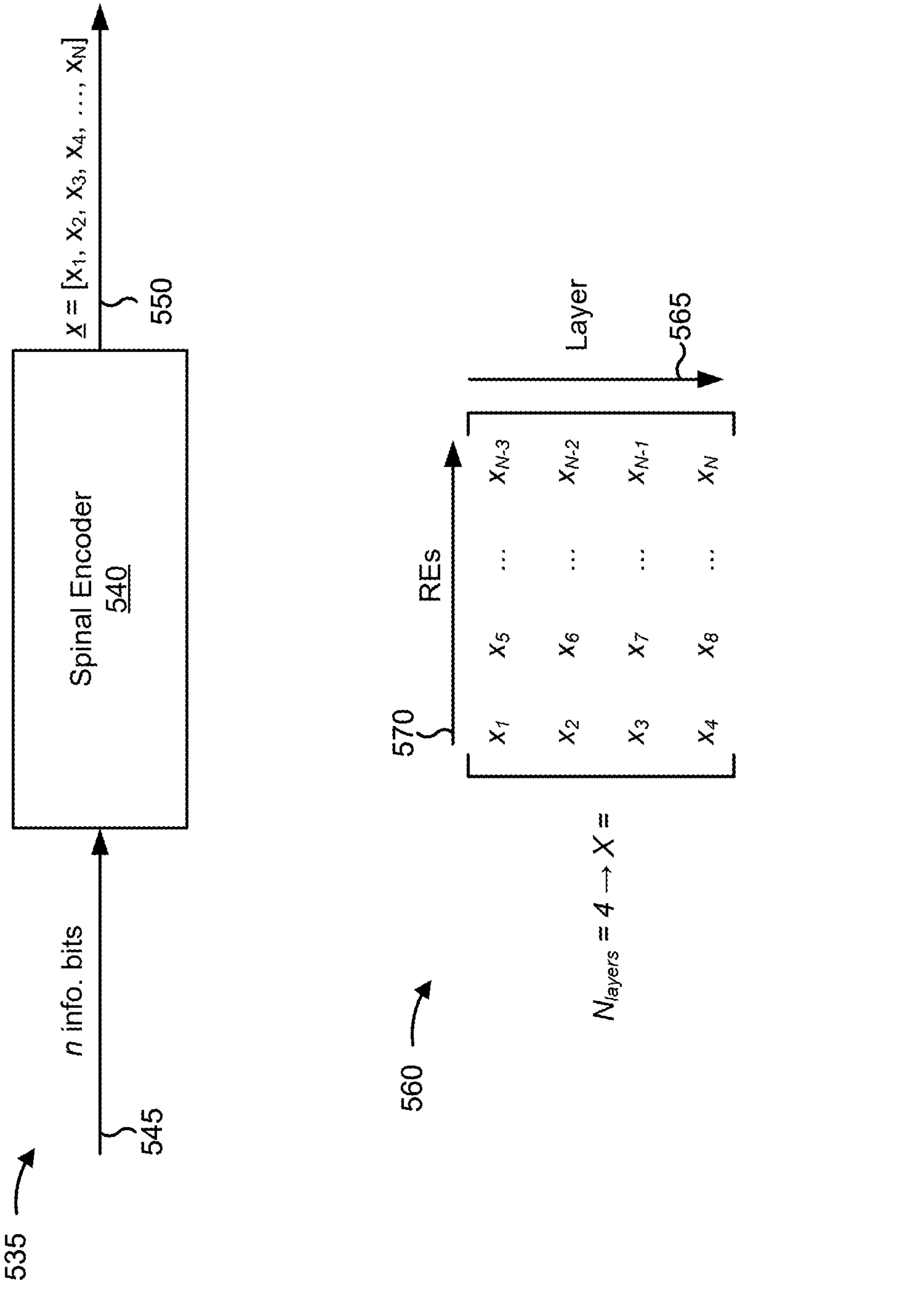

FIGS. 5A-5B are diagrams of examples associated with spinal coding schemes for MIMO wireless communications in accordance with the present disclosure. As shown in FIG. 5A, in example 500, a network node 110 (for example, a CU, a DU, and/or an RU) may communicate with a UE 120. In some examples, the network node 110 and the UE 120 may be part of a wireless network (for example, wireless communication network 100). The UE 120 and the network node 110 may have established a wireless connection prior to operations shown in FIG. 5A.

In some examples, the network node 110 and/or the UE 120 may be capable of communicating using spinal codes. In such examples, one of the network node 110 or the UE 120 may correspond to a transmitting device when the one of the network node 110 or the UE 120 is encoding messages using spinal codes and transmitting the messages to the other of the network node 110 or the UE 120, and thus the other of the network node 110 or the UE 120 may correspond to a receiving device. In some examples, the network node 110 and/or the UE 120 may correspond to both a transmitting device and a receiving device. For example, the network node 110 may be a transmitting device, and thus the UE 120 may be a receiving device, for a first message (for example, the network node 110 may encode the first message using a spinal code and/or may transmit the encoded first message to the UE 120), the UE 120 may be a transmitting device, and thus the network node 110 may be a receiving device, for a second message (for example, the UE 120 may encode the second message using a spinal code and/or may transmit the encoded second message to the network node 110), and so forth.

In a first operation 505, the network node 110 may transmit, and the UE 120 may receive, configuration information. In some examples, the UE 120 may receive the configuration information via one or more of system information (for example, a master information block (MIB) and/or a system information block (SIB), among other examples), RRC signaling, one or more MAC-CEs, and/or DCI, among other examples.

In some examples, the configuration information may indicate one or more candidate configurations and/or communication parameters. In some examples, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some examples, the subsequent indication may include a dynamic indication, such as one or more MAC CEs and/or one or more DCI messages, among other examples.

In some examples, the configuration information may include an indication of one or more parameters associated with a MIMO spinal code encoding scheme and an indication of one or more REs for communicating using the MIMO spinal code encoding scheme. In such examples, the one or more parameters may indicate a quantity of spines (for example, a quantity of v bit states, as described above in connection with FIG. 3) associated with the MIMO spinal code encoding scheme, a quantity of the multiple spinal symbols to be encoded using the MIMO spinal code encoding scheme, a quantity of multiple transmit antennas to be used to transmit multiple spinal symbols (for example, symbols encoded using the MIMO spinal code encoding scheme), a quantity of multiple receive antennas to be used to receive the multiple spinal symbols, a quantity of the multiple layers associated with the MIMO spinal code encoding scheme, a quantity of one or more REs to be used to communicate the encoded message, or an indication of a MIMO puncturing scheme associated with the MIMO spinal code encoding scheme, among other examples.

In examples in which the configuration information indicates a MIMO puncturing scheme associated with the MIMO spinal code encoding scheme, the MIMO puncturing scheme may be associated with selectively transmitting spinal symbols associated with fewer than all spines of the multiple spines. Put another way, the MIMO puncturing scheme may indicate from which spines, of the multiple spines, spinal symbols are to be transmitted and/or how to map transmitted spinal symbols to the multiple layers and the one or more REs. In such examples, the configuration information may indicate which spinal symbols are to be transmitted and/or a total quantity of spinal symbols to be transmitted, among other information. Additionally or alternatively, the MIMO puncturing scheme may be associated with, for at least one spine of the multiple spines, transmitting multiple spinal symbols associated with the at least one spine (for example, the MIMO puncturing scheme may be associated with transmitting redundant spinal symbols). In such examples, the configuration information may indicate which spinal symbols are to be transmitted multiple times and/or a quantity of redundant symbols to be transmitted, among other information. Additionally or alternatively, the MIMO puncturing scheme may be associated with transmitting a first quantity of spinal symbols for a first spine and transmitting a second quantity of spinal symbols for a second spine, with the first quantity differing from the second quantity. In such examples, the configuration information may indicate the first and second quantities, among other information.

The UE 120 may configure itself based at least in part on the configuration information. In some examples, the UE 120 may be configured to perform one or more operations described herein based at least in part on the configuration information.

In some examples, the UE 120 may transmit, and the network node 110 may receive, capability information (for example, a capabilities report) (not shown). The capability information may indicate whether the UE 120 supports a feature and/or one or more parameters related to the feature. For example, the capability information may indicate a capability and/or parameter for communicating using spinal codes. As another example, the capability information may indicate a capability and/or parameter for communicating using a MIMO spinal code encoding scheme, such as the MIMO spinal code encoding scheme described herein (for example, a spinal code encoding scheme in which spinal codes are mapped to multiple layers and/or multiple REs). One or more operations described herein may be based on the capability information. For example, the UE 120 may perform a communication in accordance with the capability information, or may receive configuration information (for example, the configuration information described above in connection with the first operation 505) that is in accordance with the capability information.

In some examples, the configuration information described in connection with the first operation 505 and/or the capability information may include information transmitted via multiple communications. Additionally or alternatively, the network node 110 may transmit the configuration information, or a communication including at least a portion of the configuration information, before and/or after the UE 120 transmits the capability information. For example, the network node 110 may transmit a first portion of the configuration information before the capability information, the UE 120 may transmit at least a portion of the capability information, and the network node 110 may transmit a second portion of the configuration information after receiving the capability information.

In a second operation 510 or a third operation 515, the network node 110 or the UE 120, respectively, may encode a message in accordance with the configuration information, resulting in a vector that includes multiple spinal symbols. More particularly, in examples in which the network node 110 is the transmitting device and the UE 120 is the receiving device, at the second operation 510 the network node 110 may encode a message in accordance with the configuration information, resulting in a vector that includes multiple spinal symbols. Additionally or alternatively, in examples in which the UE 120 is the transmitting device and the network node 110 is the receiving device, at the third operation 515 the UE 120 may encode a message in accordance with the configuration information, resulting in a vector that includes multiple spinal symbols. Examples of encoding a message using a MIMO spinal code encoding scheme, resulting in a vector that includes multiple spinal symbols, are described in more detail below in connection with FIG. 5B and example 535.

In a fourth operation 520 or a fifth operation 525, the network node 110 or the UE 120, respectively, may map the multiple spinal symbols to multiple transmit antennas, such as by distributing the multiple spinal symbols across multiple layers associated with the multiple transmit antennas and across the one or more REs in accordance with the one or more parameters associated with the MIMO spinal code encoding scheme. More particularly, in examples in which the network node 110 is the transmitting device and the UE 120 is the receiving device, at the fourth operation 520 the network node 110 may map the multiple spinal symbols to multiple transmit antennas associated with the network node 110, such as by distributing the multiple spinal symbols across multiple layers associated with the multiple transmit antennas and across the one or more REs in accordance with the one or more parameters associated with the MIMO spinal code encoding scheme. Additionally or alternatively, in examples in which the UE 120 is the transmitting device and the network node 110 is the receiving device, at the fifth operation 525 the UE 120 may map the multiple spinal symbols to multiple transmit antennas associated with the UE 120, such as by distributing the multiple spinal symbols across multiple layers associated with the multiple transmit antennas and across the one or more REs in accordance with the one or more parameters associated with the MIMO spinal code encoding scheme. In some examples, mapping the multiple spinal symbols to the multiple transmit antennas in accordance with the transmit matrix may include mapping the multiple layers to the multiple transmit antennas in accordance with a precoding matrix (for example, in accordance with a precoding matrix that converts layers to physical antennas). More particularly, as described above in connection with the second operation 510 and the third operation 515, the network node 110 or the UE 120, respectively, may encode the message, resulting in the vector that includes multiple spinal symbols. Accordingly, in the fourth operation 520 or the fifth operation 525, the network node 110 or the UE 120, respectively, may map, using the precoding matrix (for example, a precoding matrix associated with random precoding, among examples) the vector into the transmit matrix. Examples of mapping multiple spinal symbols to multiple layers and/or one or more REs are described in more detail below in connection with FIG. 5B and example 560.

In a sixth operation 530, the network node 110 and the UE 120 may communicate the multiple spinal symbols using MIMO and the one or more REs (for example, the one or more REs indicated via the configuration information). More particularly, in examples in which the network node 110 is the transmitting device and the UE 120 is the receiving device, the network node 110 may transmit (for example, using multiple transmit antennas, one for each layer of the MIMO spinal code encoding scheme, and the one or more REs), and the UE 120 may receive (for example, using multiple receive antennas, one for each layer of the MIMO spinal code encoding scheme, and the one or more REs), the multiple spinal symbols. Additionally or alternatively, in examples in which the UE 120 is the transmitting device and the network node 110 is the receiving device, the UE 120 may transmit (for example, using multiple transmit antennas, one for each layer of the MIMO spinal code encoding scheme, and the one or more REs), and the network node 110 may receive (for example, using multiple receive antennas, one for each layer of the MIMO spinal code encoding scheme, and the one or more REs), the multiple spinal symbols.

In a seventh operation 532 or an eighth operation 534, the network node 110 or the UE 120, respectively, may decode the multiple spinal symbols, resulting in multiple message bits associated with the message. More particularly, in examples in which the network node 110 is the receiving device and the UE 120 is the transmitting device, at the seventh operation 532 the network node 110 may decode the multiple spinal symbols, resulting in multiple message bits associated with the message. Additionally or alternatively, in examples in which the UE 120 is the receiving device and the network node 110 is the transmitting device, at the eighth operation 534 the UE 120 may decode the multiple spinal symbols, resulting in multiple message bits associated with the message.

In some examples, decoding the multiple spinal symbols may include decoding the multiple spinal symbols using a multi-dimensional demodulator across the one or more REs. For example, the network node 110 (for example, in the seventh operation 532) or the UE 120 (for example, in the eighth operation 534) may decode the multiple spinal symbols by, for each RE, decoding a first spinal symbol associated with a first receive antenna, resulting in a first set of decoded message bits, and decoding a second spinal symbol associated with a second receive antenna using the first set of decoded message bits, resulting in a second set of decode message bits. In this way, the MIMO spinal code encoding schemes described herein may enable improved demodulation and/or decoding procedures as compared to demodulation and/or decoding procedures associated with LDPC codes and/or polar codes, among other examples. For example, the MIMO spinal code encoding schemes described herein may enable joint demodulation-decoding of a message, in the Euclidian domain, and/or may enable utilization of dependencies between the layers (for example, that came from the communication channel) to achieve improved spectral efficiency and/or low complexity.

FIG. 5B shows an example 535 associated with using a spinal encoder 540 to encode a message into a vector of spinal symbols (such as the vector of spinal symbols described above in connection with the second operation 510 and the third operation 515). The spinal encoder 540 may be located at a transmitting device (for example, one of the network node 110 or the UE 120) that is capable of encoding and transmitting messages using a MIMO spinal code encoding scheme and/or that is configured to encode and transmit messages using the MIMO spinal code encoding scheme. In a similar manner as described above in connection with the second operation 510 and the third operation 515 of FIG. 5A, the spinal encoder 540 may be capable of encoding a message using a spinal code (for example, in accordance with the configuration information described above in connection with the first operation 505), resulting in a vector that includes multiple spinal symbols. For example, in examples in which the transmitting device is to transmit N spinal symbols, n information bits 545 may be encoded to N spinal symbols. More particularly, the n information bits 545 may be encoded, using the spinal encoder, to a transmit vector 550 (denoted as x in FIG. 5B) that includes N spinal symbols (for example, $\underline{x}=[x_1, x_2, x_3, x_4, \ldots, x_N]$, with $x_i$ corresponding to a transmitted spinal symbol). In a similar manner as described above in connection with the fourth operation 520 and the fifth operation 525, the transmit vector 550 may then be mapped to multiple layers and/or one or more REs associated with the MIMO spinal code encoding scheme.

For example, in some examples, the transmit vector 550 may be mapped to multiple layers and/or one or more REs in accordance with a transmit matrix 560 (sometimes referred to as X) and/or a precoding matrix. The transmit matrix 560 may have a size in a first dimension 565 corresponding to a quantity of layers of the MIMO spinal code encoding scheme (for example, a quantity of transmit antennas and/or receive antennas) and a size in a second dimension 570 corresponding to a quantity of the one or more REs. In such examples, for each RE in the transmit matrix 560, a subset of the multiple spinal symbols are sequentially ordered in the transmit matrix 560 in accordance with respective spine indexes associated with the subset of the multiple spinal symbols, with the subset of the multiple spinal symbols including a quantity of symbols that corresponds to the quantity of layers.

Put another way, mapping the transmit vector 550 (for example, $\underline{x}$) to a quantity of transmit antennas (sometimes referred to herein as $N_{TX}$) and/or a quantity of REs (sometimes referred to herein as $N_{RE}$) may include splitting the transmit vector 550 into chunks corresponding to the quantity of layers (sometimes referred to as $N_{layers}$) and/or generating the transmit matrix 560 (for example, X), where $$X \in C^{N_{TX} x N_{RE}},\ N_{RE} = \frac{N}{N_{layers}},\ \text{and } N_{TX} = N_{layers}$$

(assuming identity (for example, random) precoding). In that regard, in an example involving 4 layers (for example, $N_{layers}=4$, such as in examples involving 4×4 MIMO), a first column of the transmit matrix 560 (corresponding to a first configured RE) may include the first four spinal symbols of the transmit vector 550 (for example, $x_1$, $x_2$, $x_3$, and $x_4$), a second column of the transmit matrix 560 (corresponding to a second configured RE) may include the next four spinal symbols of the transmit vector 550 (for example, $x_5$, $x_6$, $x_7$, and $x_8$), and so forth through a last column of the transmit matrix 560 (corresponding to a last configured RE) that may include the last four spinal symbols of the transmit vector 550 (for example, $x_{N-3}$, $x_{N-2}$, $x_{N-1}$, and $x_N$). The transmit matrix 560 (for example, X) may then be transmitted from the transmitting device (for example, one of the network node 110 or the UE 120) through a matrix channel (sometimes referred to as H, where $H \in C^{N_{RE} \times N_{RX} \times N_{TX}}$) to the receiving device (for example, the other one of the network node 110 or the UE 120). Accordingly, the received matrix at the receiving device (sometimes referred to as Y, where $Y \in C^{N_{RE} \times N_{RX}}$) may be Y=HX+N (with "N" in this expression corresponding to noise in the channel). The received matrix (for example, Y) may then be decoded at the receiving device to retrieve the message bits (for example, the n information bits 545).

FIGS. 6A-6E are diagrams illustrating examples of spinal symbol repetition for a multiple input multiple output spinal code encoding scheme, in accordance with the present disclosure.

Figure 6A:
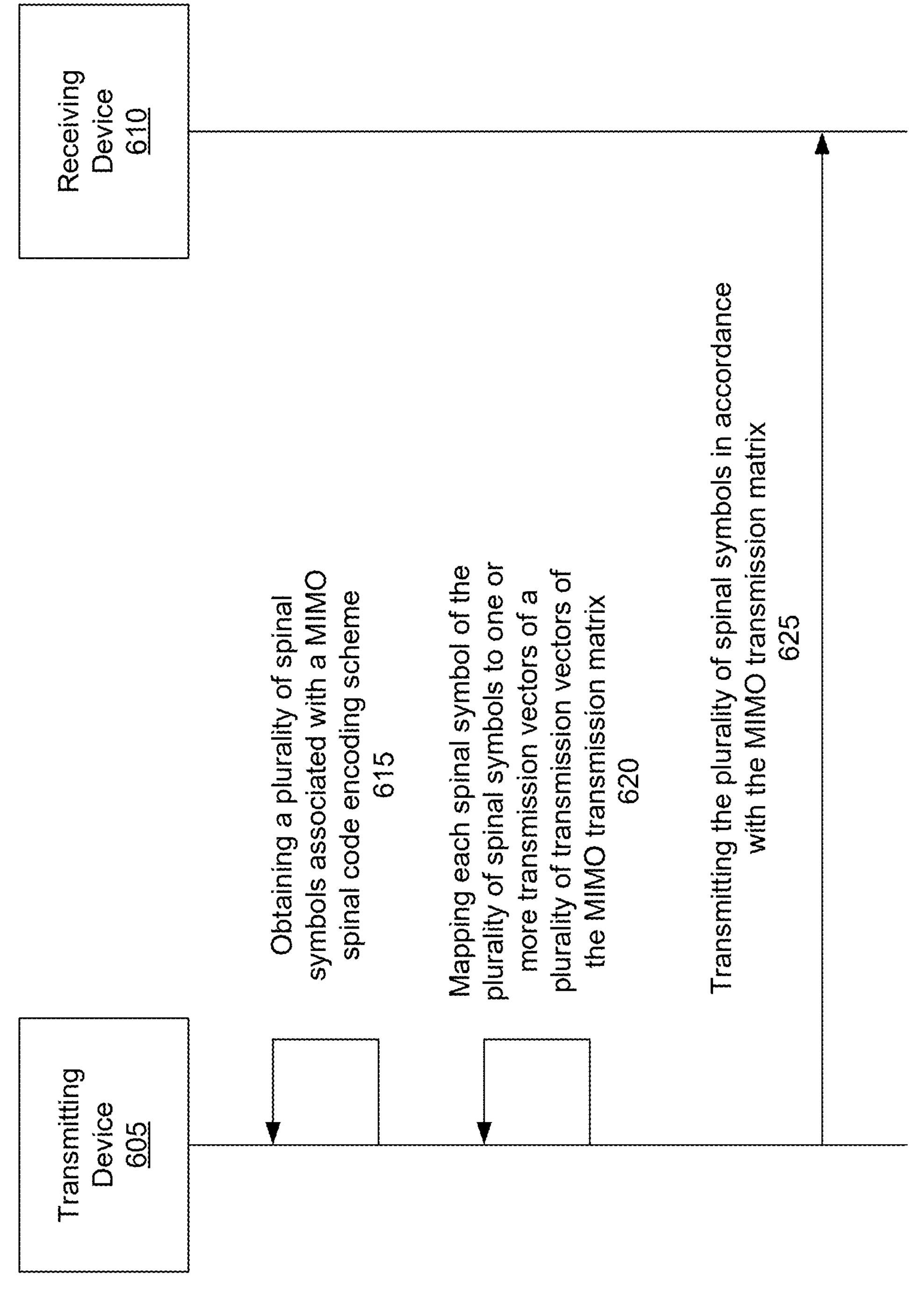
FIGS. 6A-6E are diagrams illustrating examples of spinal symbol repetition for a multiple input multiple output spinal code encoding scheme, in accordance with the present disclosure.

As shown in FIG. 6A and example 600, a transmitting device 605 may communicate with a receiving device 610. In some aspects, the transmitting device 605 may be the network node 110. In some other aspects, the transmitting device 605 may be the UE 120. In some aspects, the receiving device 610 may be the UE 120. In some other aspects, the receiving device 610 may be the network node 110.

In an operation 615, the transmitting device 605 may obtain a plurality of spinal symbols associated with a MIMO spinal code encoding scheme. In some aspects, the transmitting device 605 may obtain the plurality of spinal symbols associated with the MIMO spinal code encoding scheme using an encoder, such as the spinal encoder 540 described in connection with FIG. 5B.

In an operation 620, the transmitting device 605 may map each spinal symbol of the plurality of spinal symbols to one or more transmission vectors of a plurality of transmission vectors of a MIMO transmission matrix. In some aspects, each transmission vector of the plurality of transmission vectors corresponds to a matrix element of a plurality of matrix elements of the MIMO transmission matrix, and each matrix element of the plurality of matrix elements is associated with a single resource element and a single layer. In these aspects, at least one spinal symbol of the plurality of spinal symbols is mapped to two or more transmission vectors of the plurality of transmission vectors of the MIMO transmission matrix. In some aspects, a transmission vector may be a resource element that carries one or more layers.

In some aspects, mapping each spinal symbol to the one or more transmission vectors may include mapping the at least one spinal symbol of the plurality of spinal symbols to two or more adjacent matrix elements of the plurality of matrix elements. In these aspects, the two or more adjacent matrix elements may be associated with the same resource element of the plurality of resource elements. Additionally or alternatively, the plurality of spinal symbols may be mapped to the plurality of transmission vectors in ascending order with respect to the plurality of resource elements and in descending order with respect to the plurality of layers.

In some other aspects, mapping each spinal symbol to the one or more transmission vectors may include mapping the at least one spinal symbol of the plurality of spinal symbols to two or more non-adjacent matrix elements of the plurality of matrix elements. In these aspects, the two or more non-adjacent matrix elements may be associated with different resource elements of the plurality of resource elements. Additionally or alternatively, the plurality of spinal symbols are mapped to the plurality of transmission vectors in ascending order with respect to the plurality of resource elements and in descending order with respect to the plurality of layers.

In some aspects, mapping each spinal symbol to the one or more transmission vectors may include mapping each spinal symbol to the one or more transmission vectors in accordance with a MIMO puncturing scheme. The MIMO puncturing scheme may indicate one or more spines of a plurality of spines of the MIMO spinal code encoding scheme from which spinal symbols are to be transmitted. Additionally or alternatively, the MIMO puncturing scheme may indicate one or more spines of a plurality of spines of the MIMO spinal code encoding scheme from which spinal symbols are not to be transmitted. In some aspects, the MIMO puncturing scheme may indicate one or more parameters for mapping the plurality of spinal symbols to the plurality of resource elements and the plurality of layers.

In an operation 625, the transmitting device 605 may transmit the plurality of spinal symbols in accordance with the MIMO transmission matrix. In some aspects, transmitting the plurality of spinal symbols in accordance with the MIMO transmission matrix may include transmitting the plurality of spinal symbols from a subset of spines of a plurality of spines associated with the MIMO spinal code encoding scheme. In these aspects, transmitting the plurality of spinal symbols may include transmitting two or more spinal symbols from at least one spine of the subset of spines associated with the MIMO spinal code encoding scheme. Additionally or alternatively, transmitting the plurality of spinal symbols in accordance with the MIMO transmission matrix comprises transmitting a first quantity of spinal symbols associated with a first spine of a plurality of spines and transmitting a second quantity of spinal symbols associated with a second spine of the plurality of spines, wherein the first quantity is different than the second quantity.

Figure 6B:
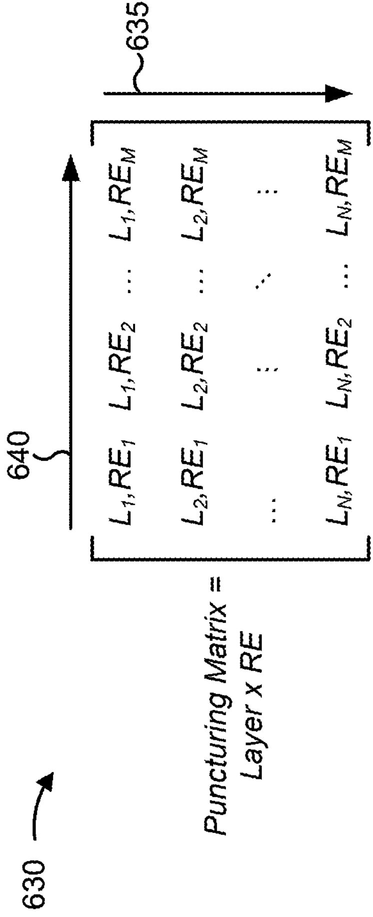

As shown in FIG. 6B, a puncturing matrix 630 may be used to map spinal symbols to transmit antennas (for example, layers) and/or REs in accordance with a MIMO puncturing scheme. The order of the puncturing matrix 630 may correspond to the quantity of layers in a first dimension 635 by a quantity of REs in a second dimension 640. For example, in aspects in which the puncturing matrix 630 is associated with N layers and M REs, a first column of the puncturing matrix 630 may include a symbol associated with a first of the N layers and a first of the M REs (shown using the notation $L_1$,$RE_1$) through a symbol associated with an Nth of the N layers and the first of the M REs (shown using the notation $L_N$,$RE_1$). Similarly, a second column of the puncturing matrix 630 may include a symbol associated with the first of the N layers and a second of the M REs (shown using the notation $L_1$,$RE_2$) through a symbol associated with the Nth of the N layers and the second of the M REs (shown using the notation $L_N$,$RE_2$). This pattern may generally repeat through a last column (for example, an $M^{th}$ column) of the puncturing matrix 630, which may include a symbol associated with the first of the N layers and an $M^{th}$ of the M REs (shown using the notation $L_1$,REM) through a symbol associated with the Nth of the N layers and the $M^{th}$ of the M REs (shown using the notation $L_N$, REM).

Figure 6C:
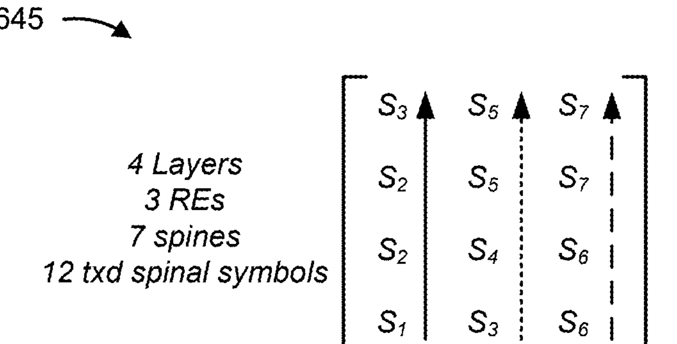

In some aspects, as shown in FIG. 6C, encoded spinal symbols may be mapped to the puncturing matrix 630 in accordance with a MIMO puncturing scheme that uses adjacent repetition symbols (for example, where repetition symbols are located on the same resource element). Puncturing matrix 645 shows one example of mapping spinal symbols (denoted as $S_i$, where i corresponds to a spine index, such as an index associated with one of the v bit states described above in connection with FIG. 3) to four layers and three REs. In this example, the message may be encoded using seven spines (for example, the spinal code may be associated with a total of seven v bit states) and/or the encoded message may be transmitted using twelve transmitted spinal symbols (for example, $\underline{x}=x_1, x_2, \ldots, x_{12}$ in this example). In such examples, because the quantity of transmitted spinal symbols (for example, twelve) exceeds the quantity of spines (for example, seven), the transmitting device 605 may transmit the spinal symbols in accordance with a MIMO puncturing scheme in which at least some spinal symbols are transmitted multiple times, such as for a purpose of transmitting redundant symbols and/or improving a decoding process at the receiving device 610.

More particularly, in these aspects, a symbol associated with the first spine (for example, $S_1$) may be transmitted once, using a fourth layer and a first RE (for example, using position $L_4$,$RE_1$ of the puncturing matrix 645). Moreover, a symbol associated with the second spine (for example, $S_2$) may be transmitted twice, using a third layer and a first RE (for example, using position $L_3$,$RE_1$ of the puncturing matrix 645) as well as a second layer and a first RE (for example, using position $L_2$,$RE_1$ of the puncturing matrix 645). Additionally, a symbol associated with the third spine (for example, $S_3$) may be transmitted twice, using a first layer and a first RE (for example, using position $L_1$,RE of the puncturing matrix 645) as well as a fourth layer and a second RE (for example, using position $L_4$,$RE_2$ of the puncturing matrix 645). Moreover, a symbol associated with the fourth spine (for example, $S_4$) may be transmitted once, using a third layer and a second RE (for example, using position $L_3$,$RE_2$ of the puncturing matrix 645). Additionally, a symbol associated with the fifth spine (for example, $S_5$) may be transmitted twice, using a second layer and a second RE (for example, using position $L_2$,$RE_2$ of the puncturing matrix 645) as well as a first layer and a second RE (for example, using position $L_1$,$RE_2$ of the puncturing matrix 645). Moreover, a symbol associated with the sixth spine (for example, $S_6$) may be transmitted twice, using a fourth layer and a third RE (for example, using position $L_4$,$RE_3$ of the puncturing matrix 645) as well as a third layer and a third RE (for example, using position $L_3$,$RE_3$ of the puncturing matrix 645). Additionally, a symbol associated with the seventh spine (for example, $S_7$) may be transmitted twice, using a second layer and a third RE (for example, using position $L_2$,$RE_3$ of the puncturing matrix 645) as well as a first layer and a third RE (for example, using position $L_1$,$RE_3$ of the puncturing matrix 645).

In some aspects, a decoding process at a receiving device 610 may be performed spine by spine, with respect to the order of the spines in the puncturing matrix 645. For example, decoding order 650 depicts how a receiving device 610 may decode spinal symbols transmitted in accordance with the puncturing matrix 645. More particularly, as indicated by the solid arrow shown in connection with the column of the puncturing matrix 645 corresponding to the first RE, after receiving the transmitted spinal symbols in the first RE (for example, using multiple receive antennas), the receiving device 610 may first decode the symbol associated with the first spine (for example, $S_1$), followed by the two symbols associated with the second spine (for example, $S_2$), followed by the symbol associated with the third spine (for example, $S_3$). Similarly, after receiving the transmitted spinal symbols in the second RE, the receiving device 610 may first decode the symbol associated with the third spine (for example, $S_3$), followed by the symbol associated with the fourth spine (for example, $S_4$), and then followed by the two symbols associated with the fifth spine (for example, $S_5$). Moreover, after receiving the transmitted spinal symbols in the third RE, the receiving device 610 may first decode the two symbols associated with the sixth spine (for example, $S_6$), followed by the two symbols associated with the seventh spine (for example, $S_7$).

Figure 6D:
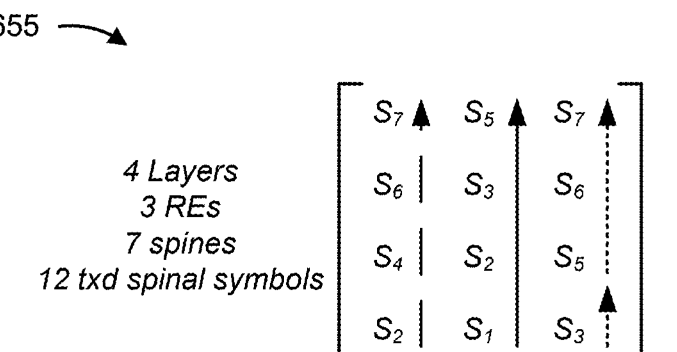

In some aspects, as shown in FIG. 6D, encoded spinal symbols may be mapped to the puncturing matrix 630 in accordance with a MIMO puncturing scheme that uses non-adjacent repetition symbols (for example, where repetition symbols are located on different resource elements). Puncturing matrix 655 shows one example of mapping spinal symbols (denoted as $S_i$, where i corresponds to a spine index, such as an index associated with one of the v bit states described above in connection with FIG. 3) to four layers and three REs. In this example, the message may be encoded using seven spines (for example, the spinal code may be associated with a total of seven v bit states) and/or the encoded message may be transmitted using twelve transmitted spinal symbols (for example, $\underline{x}=x_1, x_2, \ldots, x_{12}$ in this example). In such examples, because the quantity of transmitted spinal symbols (for example, twelve) exceeds the quantity of spines (for example, seven), the transmitting device 605 may transmit the spinal symbols in accordance with a MIMO puncturing scheme in which at least some spinal symbols are transmitted multiple times, such as for a purpose of transmitting redundant symbols and/or improving a decoding process at the receiving device 610.

More particularly, in these aspects, a symbol associated with the first spine (for example, $S_1$) may be transmitted once, using a fourth layer and a second RE (for example, using position $L_4$, $RE_2$ of the puncturing matrix 655). Moreover, a symbol associated with the second spine (for example, $S_2$) may be transmitted twice, using a third layer and a second RE (for example, using position $L_3$,$RE_2$ of the puncturing matrix 655) as well as a fourth layer and a first RE (for example, using position $L_4$,$RE_1$ of the puncturing matrix 655). Additionally, a symbol associated with the third spine (for example, $S_3$) may be transmitted twice, using a second layer and a second RE (for example, using position $L_2$,$RE_2$ of the puncturing matrix 655) as well as a fourth layer and a third RE (for example, using position $L_4$,$RE_3$ of the puncturing matrix 655). Moreover, a symbol associated with the fourth spine (for example, $S_4$) may be transmitted once, using a third layer and a first RE (for example, using position $L_3$,$RE_1$ of the puncturing matrix 655). Additionally, a symbol associated with the fifth spine (for example, $S_5$) may be transmitted twice, using a first layer and a first RE (for example, using position $L_1$,$RE_1$ of the puncturing matrix 655) as well as a third layer and a third RE (for example, using position $L_5$,$RE_5$ of the puncturing matrix 655). Moreover, a symbol associated with the sixth spine (for example, $S_6$) may be transmitted twice, using a second layer and a first RE (for example, using position $L_2$,$RE_1$ of the puncturing matrix 655) as well as a second layer and a third RE (for example, using position $L_2$,$RE_3$ of the puncturing matrix 655). Additionally, a symbol associated with the seventh spine (for example, $S_7$) may be transmitted twice, using a first layer and a first RE (for example, using position $L_1$,$RE_1$ of the puncturing matrix 655) as well as a first layer and a third RE (for example, using position $L_1$,$RE_3$ of the puncturing matrix 655).

In some aspects, a decoding process at a receiving device 610 may be performed spine by spine, with respect to the order of the spines in the puncturing matrix 655. For example, decoding order 660 depicts how a receiving device 610 may decode spinal symbols transmitted in accordance with the puncturing matrix 655. More particularly, the after receiving the spinal symbols transmitted by the transmitting device 605, the receiving device 610 may decode the symbol associated with the first spine (for example, $S_i$ located at position $L_4$,$RE_2$ of the puncturing matrix 655), followed by the two symbols associated with the second spine (for example, $S_2$ located at positions $L_3$, $RE_2$ and $L_4$,$RE_1$ of the puncturing matrix 655), followed by the two symbols associated with the third spine (for example, $S_3$ located at positions $L_3$,$RE_2$ and $L_4$,$RE_3$ of the puncturing matrix 655), followed by the symbol associated with the fourth spine (for example, $S_4$ located at position $L_3$,$RE_1$ of the puncturing matrix 655), followed by the two symbols associated with the fifth spine (for example, $S_5$ located at positions $L_3$, $RE_3$ and $L_1$,$RE_2$ of the puncturing matrix 655), followed by the two symbols associated with the sixth spine (for example, $S_6$ located at positions $L_2$,$RE_1$ and $L_2$,$RE_3$), and finally, followed by the two symbols associated with the seventh spine (for example, $S_7$ located at positions $L_1$,$RE_1$ and $L_1$,$RE_3$ of the puncturing matrix 655).

In some examples, the receiving device 610 may decode the received symbols (for example, the noisy symbols), such as by finding a valid sequence of encoded symbols that matches the received symbols within a certain threshold of noise tolerance. In this regard, a hypothesis of each decoded symbol may be used in decoding subsequent spinal symbols. Put another way, in some aspects, decoding the multiple spinal symbols includes, for each RE, decoding a first spinal symbol, of the multiple spinal symbols, associated with a first receive antenna, of the multiple receive antennas, resulting in a first set of decoded message bits, and decoding a second spinal symbol, of the multiple spinal symbols, associated with a second receive antenna, of the multiple receive antennas, resulting in a second set of decoded message bits, where decoding the second spinal symbol includes decoding the second spinal symbols using the first set of decoded message bits. For example, returning to the example puncturing matrix 645, the receiving device 610 may first attempt to decode a symbol associated with the first spine (for example, $S_1$) and then may use the decoded message bits in attempting to decode a symbol associated with the second spine (for example, $S_2$), and so forth.

Figure 6E:
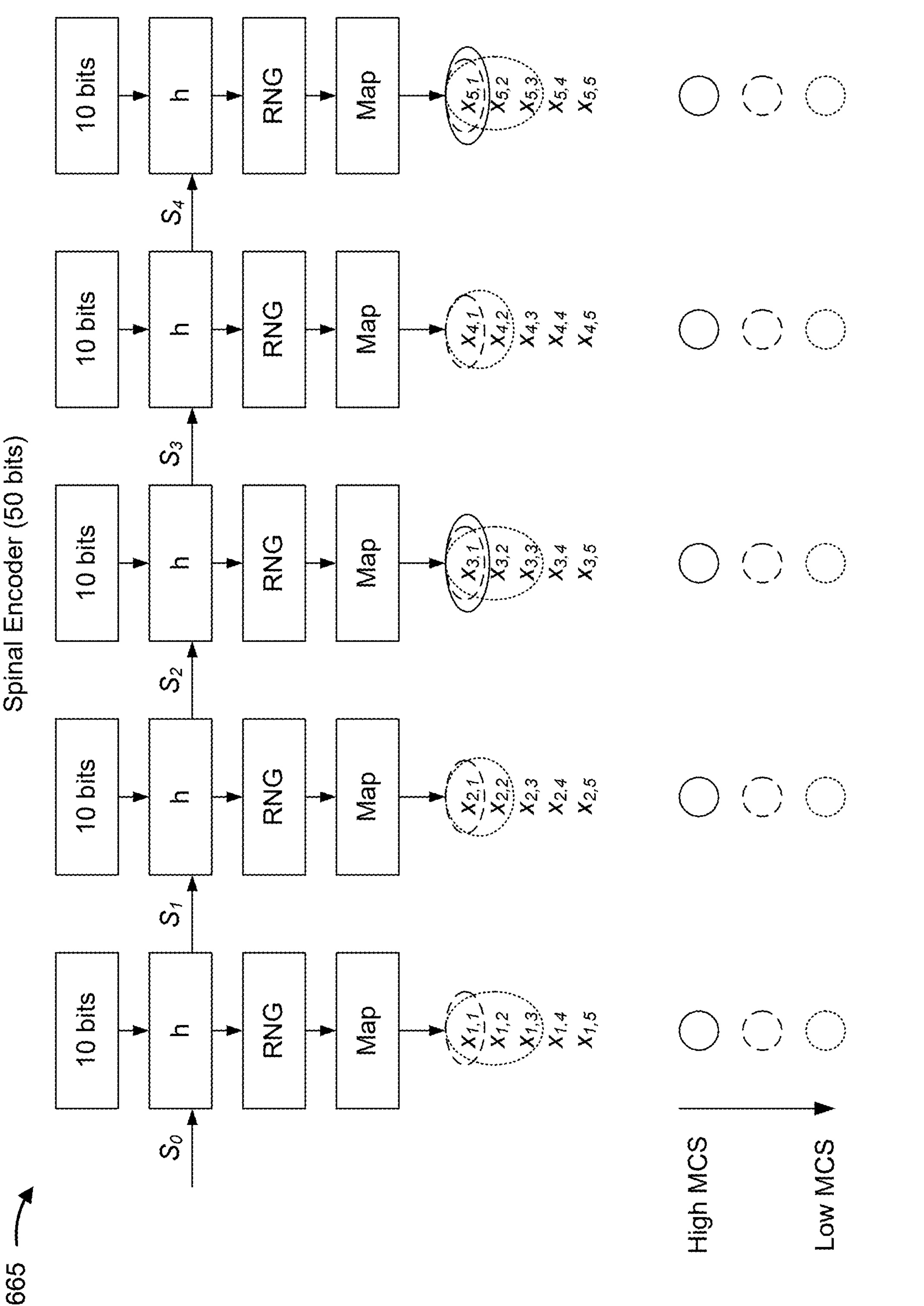

In some aspects, as shown in FIG. 6E, MIMO puncturing may be performed using a fixed-rate scheme. A fixed-rate scheme may refer to a transmission method for MIMO puncturing where an amount of data remains constant throughout the encoding process. For example, a transmitting device may calculate a quantity of spines in accordance with a fixed number of bits n (e.g., n=50) and in accordance with a maximum rate k (e.g., k=10) (e.g., five spines (n/k)). This fixed arrangement may improve a likelihood of predictable throughput and simplified resource allocation while maintaining a maximum achievable rate. In some examples, a SISO puncturing scheme may be used to achieve a precise mapping of spinal symbols to their respective spines, with each spine processing an input of a quantity of bits along with an additional input from a previous stage of the encoding scheme. In some aspects, MCS may be used to determine the number of spinal symbols per transmission.

For example, in high MCS situations, the transmitting device may use the maximum data rate (or close to the maximum data rate) by transmitting more spinal symbols per spine. Alternatively, in low MCS situations, the transmitting device may operate below the maximum data rate to reduce a likelihood of errors. As shown in example 665, an input to a first spine of the MIMO spinal code encoding scheme may include a first ten bits (bits 0-9) of a spinal encoder and a first input $S_0$. An input to a second spine of the MIMO spinal code encoding scheme may include a next ten bits (bits 10-19) of the spinal encoder and an output associated with the encoding process for the first spine. An input to a third spine of the MIMO spinal code encoding scheme may include a next ten bits (bits 20-29) of the spinal encoder and an output associated with the encoding process for the second spine. An input to a fourth spine of the MIMO spinal code encoding scheme may include a next ten bits (bits 30-39) of the spinal encoder and an output associated with the encoding process for the third spine. An input to a fifth spine of the MIMO spinal code encoding scheme may include a next ten bits (bits 40-49) of the spinal encoder and an output associated with the encoding process for the fourth spine.

Figure 7:
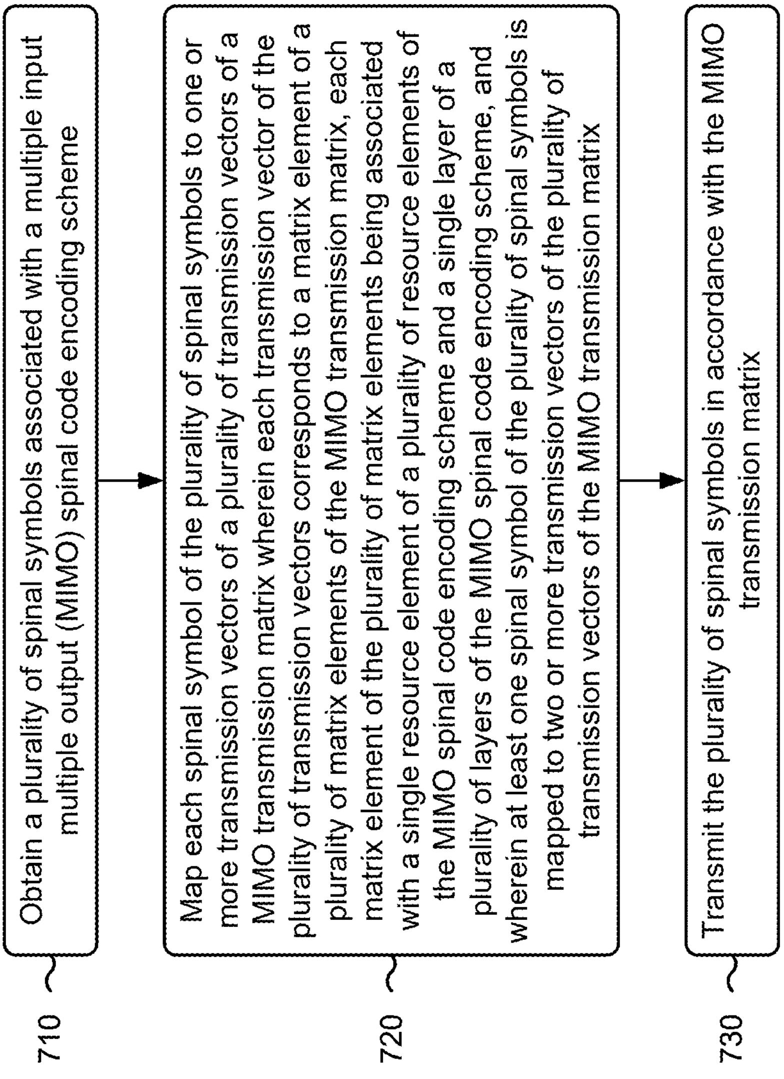
FIG. 7 is a flowchart illustrating an example process performed, for example, at a transmitting device or an apparatus of a transmitting device that supports wireless communications in accordance with the present disclosure.

FIG. 7 is a flowchart illustrating an example process 700 performed, for example, at a transmitting device or an apparatus of a transmitting device that supports wireless communications in accordance with the present disclosure. Example process 700 is an example where the apparatus or the transmitting device (for example, transmitting device 605 performs operations associated with spinal symbol repetition for MIMO spinal code encoding schemes).

As shown in FIG. 7, in some aspects, process 700 may include obtaining a plurality of spinal symbols associated with a MIMO spinal code encoding scheme (block 710). For example, the transmitting device (such as by using reception component 802 and/or generating component 810, depicted in FIG. 8) may obtain a plurality of spinal symbols associated with a MIMO spinal code encoding scheme, as described above.

As further shown in FIG. 7, in some aspects, process 700 may include mapping each spinal symbol of the plurality of spinal symbols to one or more transmission vectors of a plurality of transmission vectors of a MIMO transmission matrix, wherein each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and wherein at least one spinal symbol of the plurality of spinal symbols is mapped to two or more transmission vectors of the plurality of transmission vectors of the MIMO transmission matrix (block 720). For example, the transmitting device (such as by using communication manager 806 or mapping component 812, depicted in FIG. 8) may map each spinal symbol of the plurality of spinal symbols to one or more transmission vectors of a plurality of transmission vectors of a MIMO transmission matrix, wherein each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and wherein at least one spinal symbol of the plurality of spinal symbols is mapped to two or more transmission vectors of the plurality of transmission vectors of the MIMO transmission matrix, as described above. In some aspects, each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme. In some aspects, at least one spinal symbol of the plurality of spinal symbols is mapped to two or more transmission vectors of the plurality of transmission vectors of the MIMO transmission matrix.

As further shown in FIG. 7, in some aspects, process 700 may include transmitting the plurality of spinal symbols in accordance with the MIMO transmission matrix (block 730). For example, the transmitting device (such as by using communication manager 806 or transmission component 804, depicted in FIG. 8) may transmit the plurality of spinal symbols in accordance with the MIMO transmission matrix, as described above.

Process 700 may include additional aspects, such as any single aspect or any combination of aspects described below or in connection with one or more other processes described elsewhere herein.

In a first additional aspect, mapping each spinal symbol of the plurality of spinal symbols to the one or more transmission vectors of the plurality of transmission vectors comprises mapping the at least one spinal symbol of the plurality of spinal symbols to two or more adjacent matrix elements of the plurality of matrix elements.

In a second additional aspect, alone or in combination with the first aspect, the two or more adjacent matrix elements are associated with the same resource element of the plurality of resource elements.

In a third additional aspect, alone or in combination with one or more of the first and second aspects, the plurality of spinal symbols are mapped to the plurality of transmission vectors in ascending order with respect to the plurality of resource elements and in descending order with respect to the plurality of layers.

In a fourth additional aspect, alone or in combination with one or more of the first through third aspects, mapping each spinal symbol of the plurality of spinal symbols to the one or more transmission vectors of the plurality of transmission vectors comprises mapping the at least one spinal symbol of the plurality of spinal symbols to two or more non-adjacent matrix elements of the plurality of matrix elements.

In a fifth additional aspect, alone or in combination with one or more of the first through fourth aspects, the two or more non-adjacent matrix elements are associated with different resource elements of the plurality of resource elements.

In a sixth additional aspect, alone or in combination with one or more of the first through fifth aspects, the plurality of spinal symbols are mapped to the plurality of transmission vectors in ascending order with respect to the plurality of resource elements and in descending order with respect to the plurality of layers.

In a seventh additional aspect, alone or in combination with one or more of the first through sixth aspects, mapping each spinal symbol of the plurality of spinal symbols to the one or more transmission vectors of the plurality of transmission vectors comprises mapping each spinal symbol of the plurality of spinal symbols to the one or more transmission vectors in accordance with a MIMO puncturing scheme.

In an eighth additional aspect, alone or in combination with one or more of the first through seventh aspects, the MIMO puncturing scheme indicates one or more spines of a plurality of spines of the MIMO spinal code encoding scheme from which spinal symbols are to be transmitted.

In a ninth additional aspect, alone or in combination with one or more of the first through eighth aspects, the MIMO puncturing scheme indicates one or more spines of a plurality of spines of the MIMO spinal code encoding scheme from which spinal symbols are not to be transmitted.

In a tenth additional aspect, alone or in combination with one or more of the first through ninth aspects, the MIMO puncturing scheme indicates one or more parameters for mapping the plurality of spinal symbols to the plurality of resource elements and the plurality of layers.

In an eleventh additional aspect, alone or in combination with one or more of the first through tenth aspects, transmitting the plurality of spinal symbols in accordance with the MIMO transmission matrix comprises transmitting the plurality of spinal symbols from a subset of spines of a plurality of spines associated with the MIMO spinal code encoding scheme.

In a twelfth additional aspect, alone or in combination with one or more of the first through eleventh aspects, transmitting the plurality of spinal symbols from the subset of spines of the MIMO spinal code encoding scheme comprises transmitting two or more spinal symbols from at least one spine of the subset of spines associated with the MIMO spinal code encoding scheme.

In a thirteenth additional aspect, alone or in combination with one or more of the first through twelfth aspects, transmitting the plurality of spinal symbols in accordance with the MIMO transmission matrix comprises transmitting a first quantity of spinal symbols associated with a first spine of a plurality of spines and transmitting a second quantity of spinal symbols associated with a second spine of the plurality of spines, wherein the first quantity is different than the second quantity.

In a fourteenth additional aspect, alone or in combination with one or more of the first through thirteenth aspects, the transmitting device is a user equipment, and wherein the method further comprises receiving configuration information that indicates one or more parameters associated with the MIMO spinal code encoding scheme and that indicates the plurality of resource elements for communicating in accordance with the MIMO spinal code encoding scheme.

In a fifteenth additional aspect, alone or in combination with one or more of the first through fourteenth aspects, the transmitting device is a network node, and wherein the method further comprises transmitting configuration information that indicates one or more parameters associated with the MIMO spinal code encoding scheme and that indicates the plurality of resource elements for communicating in accordance with the MIMO spinal code encoding scheme.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
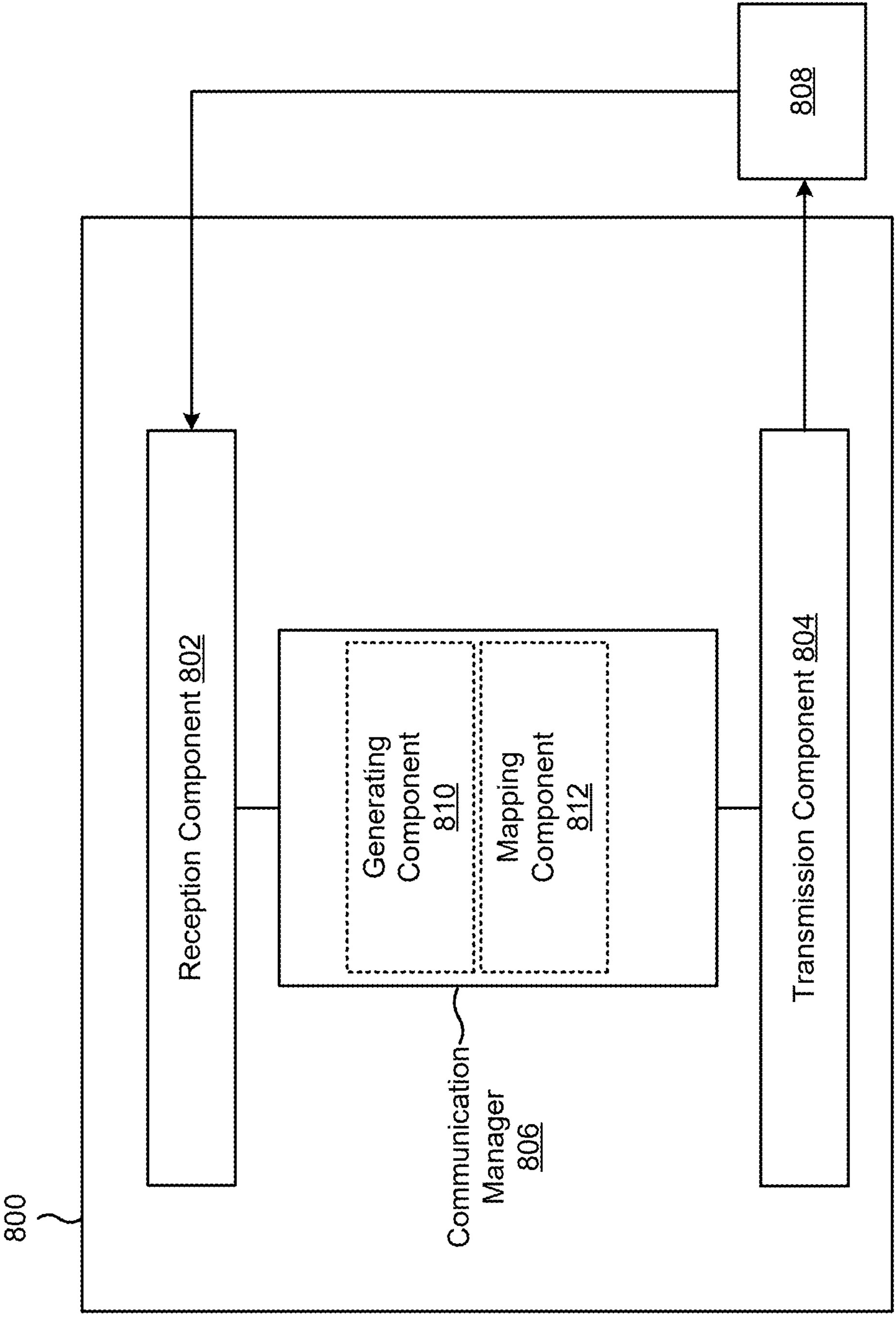
FIG. 8 is a diagram of an example apparatus for wireless communication that supports wireless communications in accordance with the present disclosure.

FIG. 8 is a diagram of an example apparatus 800 for wireless communication that supports wireless communications in accordance with the present disclosure. The apparatus 800 may be a transmitting device (such as the transmitting device 605), or a transmitting device may include the apparatus 800. In some aspects, the apparatus 800 includes a reception component 802, a transmission component 804, and a communication manager 806, which may be in communication with one another (for example, via one or more buses). As shown, the apparatus 800 may communicate with another apparatus 808 (such as a UE 120, a network node 110, or another wireless communication device) using the reception component 802 and the transmission component 804. The communication manager 806 may be included in, or implemented via, a processing system (for example, the processing system 140). In some aspects, the communication manager 806 is the communication manager 150.

In some aspects, the apparatus 800 may be configured to and/or operable to perform one or more operations described herein in connection with FIGS. 6A-6D. Additionally or alternatively, the apparatus 800 may be configured to and/or operable to perform one or more processes described herein, such as process 700 of FIG. 7.

The reception component 802 may receive communications, such as reference signals, control information, and/or data communications, from the apparatus 808. The reception component 802 may provide received communications to one or more other components of the apparatus 800, such as the communication manager 806. In some aspects, the reception component 802 may perform signal processing on the received communications, and may provide the processed signals to the one or more other components in a similar manner as described above in connection with FIG. 1. In some aspects, the reception component 802 may include one or more components of the transmitting device described above in connection with FIG. 1, such as a radio, one or more RF chains, one or more transceivers, or one or more modems, each of which may in turn be coupled with one or more antennas of the transmitting device.

The transmission component 804 may transmit communications, such as reference signals, control information, and/or data communications, to the apparatus 808. In some aspects, the communication manager 806 may generate communications and may transmit the generated communications to the transmission component 804 for transmission to the apparatus 808. In some aspects, the transmission component 804 may perform signal processing on the generated communications, and may transmit the processed signals to the apparatus 808 in a similar manner as described above in connection with FIG. 1. In some aspects, the transmission component 804 may include one or more components of the transmitting device described above in connection with FIG. 1, such as a radio, one or more RF chains, one or more transceivers, or one or more modems, each of which may in turn be coupled with one or more antennas of the transmitting device. In some aspects, the transmission component 804 may be co-located with the reception component 802.

The communication manager 806 may obtain a plurality of spinal symbols associated with a MIMO spinal code encoding scheme. The communication manager 806 may map each spinal symbol of the plurality of spinal symbols to one or more transmission vectors of a plurality of transmission vectors of a MIMO transmission matrix wherein each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and wherein at least one spinal symbol of the plurality of spinal symbols is mapped to two or more transmission vectors of the plurality of transmission vectors of the MIMO transmission matrix. The communication manager 806 may transmit or may cause the transmission component 804 to transmit the plurality of spinal symbols in accordance with the MIMO transmission matrix. In some aspects, the communication manager 806 may perform one or more operations described elsewhere herein as being performed by one or more components of the communication manager 806.

In some aspects, the communication manager 806 includes a set of components, such as a generating component 810 and/or a mapping component 812. Alternatively, the set of components may be separate and distinct from the communication manager 806. As used herein, the term "component" is intended to be broadly construed as hardware or a combination of hardware and at least one of software or firmware. In some aspects, one or more components of the set of components may include or may be implemented within a processing system (for example, the processing system 140). Additionally or alternatively, one or more components of the set of components may be implemented at least in part as software stored in one or more memories (for example, the memory described with reference to FIG. 1). For example, a component (or a portion of a component) may be implemented as instructions or code stored in a non-transitory computer-readable medium and executable by the processing system to perform the functions or operations of the component.

The reception component 802 and/or the generating component 810 may obtain a plurality of spinal symbols associated with a MIMO spinal code encoding scheme. The mapping component 812 may map each spinal symbol of the plurality of spinal symbols to one or more transmission vectors of a plurality of transmission vectors of a MIMO transmission matrix wherein each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and wherein at least one spinal symbol of the plurality of spinal symbols is mapped to two or more transmission vectors of the plurality of transmission vectors of the MIMO transmission matrix. The transmission component 804 may transmit the plurality of spinal symbols in accordance with the MIMO transmission matrix.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method for wireless communication by a transmitting device, comprising: obtaining a plurality of spinal symbols associated with a multiple input multiple output (MIMO) spinal code encoding scheme; mapping each spinal symbol of the plurality of spinal symbols to one or more transmission vectors of a plurality of transmission vectors of a MIMO transmission matrix, wherein each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and wherein at least one spinal symbol of the plurality of spinal symbols is mapped to two or more transmission vectors of the plurality of transmission vectors of the MIMO transmission matrix; and transmitting the plurality of spinal symbols in accordance with the MIMO transmission matrix.

Aspect 2: The method of Aspect 1, wherein mapping each spinal symbol of the plurality of spinal symbols to the one or more transmission vectors of the plurality of transmission vectors comprises mapping the at least one spinal symbol of the plurality of spinal symbols to two or more adjacent matrix elements of the plurality of matrix elements.

Aspect 3: The method of Aspect 2, wherein the two or more adjacent matrix elements are associated with the same resource element of the plurality of resource elements.

Aspect 4: The method of Aspect 2, wherein the plurality of spinal symbols are mapped to the plurality of transmission vectors in ascending order with respect to the plurality of resource elements and in descending order with respect to the plurality of layers.

Aspect 5: The method of any of Aspects 1-4, wherein mapping each spinal symbol of the plurality of spinal symbols to the one or more transmission vectors of the plurality of transmission vectors comprises mapping the at least one spinal symbol of the plurality of spinal symbols to two or more non-adjacent matrix elements of the plurality of matrix elements.

Aspect 6: The method of Aspect 5, wherein the two or more non-adjacent matrix elements are associated with different resource elements of the plurality of resource elements.

Aspect 7: The method of Aspect 5, wherein the plurality of spinal symbols are mapped to the plurality of transmission vectors in ascending order with respect to the plurality of resource elements and in descending order with respect to the plurality of layers.

Aspect 8: The method of any of Aspects 1-7, wherein mapping each spinal symbol of the plurality of spinal symbols to the one or more transmission vectors of the plurality of transmission vectors comprises mapping each spinal symbol of the plurality of spinal symbols to the one or more transmission vectors in accordance with a MIMO puncturing scheme.

Aspect 9: The method of Aspect 8, wherein the MIMO puncturing scheme indicates one or more spines of a plurality of spines of the MIMO spinal code encoding scheme from which spinal symbols are to be transmitted.

Aspect 10: The method of Aspect 8, wherein the MIMO puncturing scheme indicates one or more spines of a plurality of spines of the MIMO spinal code encoding scheme from which spinal symbols are not to be transmitted.

Aspect 11: The method of Aspect 8, wherein the MIMO puncturing scheme indicates one or more parameters for mapping the plurality of spinal symbols to the plurality of resource elements and the plurality of layers.

Aspect 12: The method of Aspect 8, wherein transmitting the plurality of spinal symbols in accordance with the MIMO transmission matrix comprises transmitting the plurality of spinal symbols from a subset of spines of a plurality of spines associated with the MIMO spinal code encoding scheme.

Aspect 13: The method of Aspect 12, wherein transmitting the plurality of spinal symbols from the subset of spines of the MIMO spinal code encoding scheme comprises transmitting two or more spinal symbols from at least one spine of the subset of spines associated with the MIMO spinal code encoding scheme.

Aspect 14: The method of Aspect 8, wherein transmitting the plurality of spinal symbols in accordance with the MIMO transmission matrix comprises transmitting a first quantity of spinal symbols associated with a first spine of a plurality of spines and transmitting a second quantity of spinal symbols associated with a second spine of the plurality of spines, wherein the first quantity is different than the second quantity.

Aspect 15: The method of any of Aspects 1-14, wherein the transmitting device is a user equipment, and wherein the method further comprises receiving configuration information that indicates one or more parameters associated with the MIMO spinal code encoding scheme and that indicates the plurality of resource elements for communicating in accordance with the MIMO spinal code encoding scheme.

Aspect 16: The method of any of Aspects 1-15, wherein the transmitting device is a network node, and wherein the method further comprises transmitting configuration information that indicates one or more parameters associated with the MIMO spinal code encoding scheme and that indicates the plurality of resource elements for communicating in accordance with the MIMO spinal code encoding scheme.

Aspect 17: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-16.

Aspect 18: An apparatus for wireless communication at a device, the apparatus comprising one or more memories and one or more processors coupled to the one or more memories, the one or more processors configured to cause the device to perform the method of one or more of Aspects 1-16.

Aspect 19: An apparatus for wireless communication, the apparatus comprising at least one means for performing the method of one or more of Aspects 1-16.

Aspect 20: A non-transitory computer-readable medium storing code for wireless communication, the code comprising instructions executable by one or more processors to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

Aspect 22: A device for wireless communication, the device comprising a processing system that includes one or more processors and one or more memories coupled with the one or more processors, the processing system configured to cause the device to perform the method of one or more of Aspects 1-16.

Aspect 23: An apparatus for wireless communication at a device, the apparatus comprising one or more memories and one or more processors coupled to the one or more memories, the one or more processors individually or collectively configured to cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects. No element, act, or instruction described herein should be construed as critical or essential unless explicitly described as such.

It will be apparent that systems or methods described herein may be implemented in different forms of hardware or a combination of hardware and software. The actual specialized control hardware or software used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, the articles "a" and "an" are intended to refer to one or more items and may be used interchangeably with "one or more" or "at least one." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or "a single one" or similar language is used. Also, as used herein, the terms "has," "have," "having," "comprise," "comprising," "include" and "including," and derivatives thereof or similar terms are intended to be open-ended terms that do not limit an element that they modify (for example, an element "having" A may also have B). Also, as used herein, the term "or" is intended to be inclusive when used in a series and may be used interchangeably with "and/or," unless explicitly stated otherwise (for example, if used in combination with "either" or "only one of"). As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

As used herein, the term "determine" or "determining" encompasses a wide variety of actions and, therefore, "determining" can include calculating, computing, processing, deriving, estimating, investigating, looking up (such as via looking up in a table, a database, or another data structure), searching, inferring, ascertaining, and/or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing, and/or other such similar actions.

As used herein, the phrase "based on" is intended to mean "based at least in part on" or "based on or otherwise in association with" unless explicitly stated otherwise. As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the scope of all aspects described herein. Many of these features may be combined in ways not specifically recited in the claims or disclosed in the specification. The disclosure of various aspects includes each dependent claim in combination with every other claim in the claim set.

What is claimed is:

1. A transmitting device for wireless communication, comprising:
- a processing system that includes one or more processors and one or more memories coupled with the one or more processors, the processing system configured to cause the transmitting device to:
  - obtain a plurality of spinal symbols associated with a multiple input multiple output (MIMO) spinal code encoding scheme;
  - map each spinal symbol of the plurality of spinal symbols to one or more transmission vectors of a plurality of transmission vectors of a MIMO transmission matrix,
    - wherein each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and
    - wherein at least one spinal symbol of the plurality of spinal symbols is mapped to two or more transmission vectors of the plurality of transmission vectors of the MIMO transmission matrix; and
  - transmit the plurality of spinal symbols in accordance with the MIMO transmission matrix.

2. The transmitting device of claim 1, wherein, to cause the transmitting device to map each spinal symbol of the plurality of spinal symbols to the one or more transmission vectors of the plurality of transmission vectors, the processing system is configured to cause the transmitting device to map the at least one spinal symbol of the plurality of spinal symbols to two or more adjacent matrix elements of the plurality of matrix elements.

3. The transmitting device of claim 2, wherein the two or more adjacent matrix elements are associated with the same resource element of the plurality of resource elements.

4. The transmitting device of claim 2, wherein the plurality of spinal symbols are mapped to the plurality of transmission vectors in ascending order with respect to the plurality of resource elements and in descending order with respect to the plurality of layers.

5. The transmitting device of claim 1, wherein, to cause the transmitting device to map each spinal symbol of the plurality of spinal symbols to the one or more transmission vectors of the plurality of transmission vectors, the processing system is configured to cause the transmitting device to map the at least one spinal symbol of the plurality of spinal symbols to two or more non-adjacent matrix elements of the plurality of matrix elements.

6. The transmitting device of claim 5, wherein the two or more non-adjacent matrix elements are associated with different resource elements of the plurality of resource elements.

7. The transmitting device of claim 5, wherein the plurality of spinal symbols are mapped to the plurality of transmission vectors in ascending order with respect to the plurality of resource elements and in descending order with respect to the plurality of layers.

8. The transmitting device of claim 1, wherein, to cause the transmitting device to map each spinal symbol of the plurality of spinal symbols to the one or more transmission vectors of the plurality of transmission vectors, the processing system is configured to cause the transmitting device to map each spinal symbol of the plurality of spinal symbols to the one or more transmission vectors in accordance with a MIMO puncturing scheme.

9. The transmitting device of claim 8, wherein the MIMO puncturing scheme indicates one or more spines of a plurality of spines of the MIMO spinal code encoding scheme from which spinal symbols are to be transmitted.

10. The transmitting device of claim 8, wherein the MIMO puncturing scheme indicates one or more spines of a plurality of spines of the MIMO spinal code encoding scheme from which spinal symbols are not to be transmitted.

11. The transmitting device of claim 8, wherein the MIMO puncturing scheme indicates one or more parameters for mapping the plurality of spinal symbols to the plurality of resource elements and the plurality of layers.

12. The transmitting device of claim 8, wherein, to cause the transmitting device to transmit the plurality of spinal symbols in accordance with the MIMO transmission matrix, the processing system is configured to cause the transmitting device to transmit the plurality of spinal symbols from a subset of spines of a plurality of spines associated with the MIMO spinal code encoding scheme.

13. The transmitting device of claim 12, wherein, to cause the transmitting device to transmit the plurality of spinal symbols from the subset of spines of the MIMO spinal code encoding scheme, the processing system is configured to cause the transmitting device to transmit two or more spinal symbols from at least one spine of the subset of spines associated with the MIMO spinal code encoding scheme.

14. The transmitting device of claim 8, wherein transmitting the plurality of spinal symbols in accordance with the MIMO transmission matrix comprises transmitting a first quantity of spinal symbols associated with a first spine of a plurality of spines and transmitting a second quantity of spinal symbols associated with a second spine of the plurality of spines, wherein the first quantity is different than the second quantity.

15. A method for wireless communication by a transmitting device, comprising:

obtaining a plurality of spinal symbols associated with a multiple input multiple output (MIMO) spinal code encoding scheme;

mapping each spinal symbol of the plurality of spinal symbols to one or more transmission vectors of a plurality of transmission vectors of a MIMO transmission matrix, wherein each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and wherein at least one spinal symbol of the plurality of spinal symbols is mapped to two or more transmission vectors of the plurality of transmission vectors of the MIMO transmission matrix; and transmitting the plurality of spinal symbols in accordance with the MIMO transmission matrix.

16. The method of claim 15, wherein mapping each spinal symbol of the plurality of spinal symbols to the one or more transmission vectors of the plurality of transmission vectors comprises mapping the at least one spinal symbol of the plurality of spinal symbols to two or more adjacent matrix elements of the plurality of matrix elements.

17. The method of claim 16, wherein the two or more adjacent matrix elements are associated with the same resource element of the plurality of resource elements.

18. The method of claim 16, wherein the plurality of spinal symbols are mapped to the plurality of transmission vectors in ascending order with respect to the plurality of resource elements and in descending order with respect to the plurality of layers.

19. The method of claim 17, wherein mapping each spinal symbol of the plurality of spinal symbols to the one or more transmission vectors of the plurality of transmission vectors comprises mapping the at least one spinal symbol of the plurality of spinal symbols to two or more non-adjacent matrix elements of the plurality of matrix elements.

20. The method of claim 19, wherein the two or more non-adjacent matrix elements are associated with different resource elements of the plurality of resource elements.

21. The method of claim 19, wherein the plurality of spinal symbols are mapped to the plurality of transmission vectors in ascending order with respect to the plurality of resource elements and in descending order with respect to the plurality of layers.

22. The method of claim 15, wherein mapping each spinal symbol of the plurality of spinal symbols to the one or more transmission vectors of the plurality of transmission vectors comprises mapping each spinal symbol of the plurality of spinal symbols to the one or more transmission vectors in accordance with a MIMO puncturing scheme.

23. The method of claim 22, wherein the MIMO puncturing scheme indicates one or more spines of a plurality of spines of the MIMO spinal code encoding scheme from which spinal symbols are to be transmitted.

24. The method of claim 22, wherein the MIMO puncturing scheme indicates one or more spines of a plurality of spines of the MIMO spinal code encoding scheme from which spinal symbols are not to be transmitted.

25. The method of claim 22, wherein the MIMO puncturing scheme indicates one or more parameters for mapping the plurality of spinal symbols to the plurality of resource elements and the plurality of layers.

26. The method of claim 22, wherein transmitting the plurality of spinal symbols in accordance with the MIMO transmission matrix comprises transmitting the plurality of spinal symbols from a subset of spines of a plurality of spines associated with the MIMO spinal code encoding scheme.

27. The method of claim 26, wherein transmitting the plurality of spinal symbols from the subset of spines of the MIMO spinal code encoding scheme comprises transmitting two or more spinal symbols from at least one spine of the subset of spines associated with the MIMO spinal code encoding scheme.

28. The method of claim 22, wherein transmitting the plurality of spinal symbols in accordance with the MIMO transmission matrix comprises transmitting a first quantity of spinal symbols associated with a first spine of a plurality of spines and transmitting a second quantity of spinal symbols associated with a second spine of the plurality of spines, wherein the first quantity is different than the second quantity.

29. A non-transitory computer-readable medium storing a set of instructions for wireless communication, the set of instructions comprising:

one or more instructions that, when executed by one or more processors of a transmitting device, cause the transmitting device to:

obtain a plurality of spinal symbols associated with a multiple input multiple output (MIMO) spinal code encoding scheme;

map each spinal symbol of the plurality of spinal symbols to one or more transmission vectors of a plurality of transmission vectors of a MIMO transmission matrix, wherein each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and wherein at least one spinal symbol of the plurality of spinal symbols is mapped to two or more transmission vectors of the plurality of transmission vectors of the MIMO transmission matrix; and transmit the plurality of spinal symbols in accordance with the MIMO transmission matrix.

30. An apparatus for wireless communication, comprising:

means for obtaining a plurality of spinal symbols associated with a multiple input multiple output (MIMO) spinal code encoding scheme;

means for mapping each spinal symbol of the plurality of spinal symbols to one or more transmission vectors of a plurality of transmission vectors of a MIMO transmission matrix, wherein each transmission vector of the plurality of transmission vectors corresponds to a matrix element of a plurality of matrix elements of the MIMO transmission matrix, each matrix element of the plurality of matrix elements being associated with a single resource element of a plurality of resource elements of the MIMO spinal code encoding scheme and a single layer of a plurality of layers of the MIMO spinal code encoding scheme, and wherein at least one spinal symbol of the plurality of spinal symbols is mapped to two or more transmission vectors of the plurality of transmission vectors of the MIMO transmission matrix; and means for transmitting the plurality of spinal symbols in accordance with the MIMO transmission matrix.

* * * * *